(12) United States Patent
Benkley, III

(10) Patent No.: US 7,099,496 B2
(45) Date of Patent: Aug. 29, 2006

(54) SWIPED APERTURE CAPACITIVE FINGERPRINT SENSING SYSTEMS AND METHODS

(75) Inventor: Fred G. Benkley, III, Springfield, MA (US)

(73) Assignee: Validity Sensors, Inc., Phoenix, AZ (US)

( * ) Notice: Subject to any disclaimer, the term of this patent is extended or adjusted under 35 U.S.C. 154(b) by 310 days.

(21) Appl. No.: 10/005,643

(22) Filed: Dec. 5, 2001

(65) Prior Publication Data

US 2003/0035570 A1  Feb. 20, 2003

Related U.S. Application Data

(60) Provisional application No. 60/251,371, filed on Dec. 5, 2000.

(51) Int. Cl.
*G06K 9/00* (2006.01)

(52) U.S. Cl. .................... 382/124; 361/280; 324/661; 73/514.32

(58) Field of Classification Search ............... 382/106, 382/107, 122, 124–127; 356/3–22, 27–28.5, 356/71; 73/514.32; 361/280–330; 324/686, 324/666, 662
See application file for complete search history.

(56) References Cited

U.S. PATENT DOCUMENTS

| | | |
|---|---|---|
| 4,353,056 A | 10/1982 | Tsikos |
| 4,525,859 A | 6/1985 | Bowles et al. |
| 4,550,221 A | 10/1985 | Mabusth |
| 5,076,566 A | 12/1991 | Kriegel |
| 5,109,427 A | 4/1992 | Yang |
| 5,305,017 A | 4/1994 | Gerpheide |
| 5,325,442 A | 6/1994 | Knapp |
| 5,420,936 A | 5/1995 | Fitzpatrick et al. |
| 5,627,316 A | 5/1997 | De Winter et al. |
| 5,818,956 A | 10/1998 | Tuli |
| 5,852,670 A | 12/1998 | Setlak et al. |
| 5,940,526 A | 8/1999 | Setlak et al. |
| 6,002,815 A | 12/1999 | Immega et al. |

(Continued)

FOREIGN PATENT DOCUMENTS

DE        2213813        10/1973

(Continued)

OTHER PUBLICATIONS

Search Report Mailed Sep. 8, 2005 for International Application No.: PCT/US2005/012792.

(Continued)

*Primary Examiner*—Jingge Wu
*Assistant Examiner*—Aaron Carter
(74) *Attorney, Agent, or Firm*—Wolf, Greenfield & Sacks, P.C.

(57) ABSTRACT

A fingerprint sensing system includes an image sensor, a rate sensor and a sensor circuit. The image sensor includes a linear array of capacitive sensors for capacitive sensing of ridge peaks and ridge valleys of a fingerprint on a swiped finger. The rate sensor senses the speed of the finger as it is swiped across the image sensor. The sensor circuit supplies image drive signals to the image sensor and detects image signals in response to the drive signals. The sensor circuit supplies rate drive signals to the rate sensor and detects rate signals in response to the rate drive signals. The sensor circuit further coordinates the image signals and the rate signals to provide a fingerprint image. The image sensor may be configured as an image pickup plate and multiple image drive plates formed on a substrate, such as a flexible printed circuit board or other flexible substrate which may conform to the shape of the finger.

69 Claims, 24 Drawing Sheets

U.S. PATENT DOCUMENTS

| | | | |
|---|---|---|---|
| 6,016,355 | A | 1/2000 | Dickinson et al. |
| 6,259,108 | B1 | 7/2001 | Antonelli et al. |
| 6,289,114 | B1 * | 9/2001 | Mainguet ............... 382/124 |
| 6,317,508 | B1 * | 11/2001 | Kramer et al. ............ 382/124 |
| 6,320,394 | B1 * | 11/2001 | Tartagni ............... 324/671 |
| 6,333,989 | B1 * | 12/2001 | Borza .................... 382/124 |
| 6,346,739 | B1 | 2/2002 | Lepert et al. |
| 6,347,040 | B1 | 2/2002 | Fries et al. |
| 6,362,633 | B1 | 3/2002 | Tartagni |
| 6,400,836 | B1 | 6/2002 | Senior |
| 6,408,087 | B1 | 6/2002 | Kramer |
| 6,580,816 | B1 | 6/2003 | Kramer et al. |
| 6,643,389 | B1 * | 11/2003 | Raynal et al. ............ 382/124 |
| 6,672,174 | B1 | 1/2004 | Deconde et al. |
| 6,785,407 | B1 * | 8/2004 | Tschudi et al. ............ 382/124 |
| 2001/0043728 | A1 | 11/2001 | Kramer et al. |
| 2002/0067845 | A1 * | 6/2002 | Griffis ................... 382/107 |
| 2003/0035570 | A1 | 2/2003 | Benkley, III |
| 2003/0161512 | A1 | 8/2003 | Mathiassen et al. |
| 2003/0224553 | A1 | 12/2003 | Manansala |
| 2004/0012773 | A1 * | 1/2004 | Puttkammer ............ 356/71 |
| 2005/0100196 | A1 | 5/2005 | Scott et al. |

FOREIGN PATENT DOCUMENTS

| | | | |
|---|---|---|---|
| EP | 1018697 | A | 7/2000 |
| EP | 1 139 301 | A2 | 10/2001 |
| EP | 1 531 419 | A2 | 5/2005 |
| GB | 2 331 613 | A | 5/1999 |
| WO | WO 90/03620 | A1 | 4/1990 |
| WO | WO 98/53242 | A | 12/1998 |
| WO | WO 99/28701 | A | 6/1999 |
| WO | WO 99/43258 | A | 9/1999 |
| WO | WO 02/061668 | A1 | 8/2000 |
| WO | WO 01/22349 | A1 | 3/2001 |
| WO | WO 01/94902 | A | 12/2001 |
| WO | WO 02/47018 | A2 | 6/2002 |
| WO | WO 02/077907 | A1 | 10/2002 |
| WO | WO 03/075210 | A2 | 9/2003 |
| WO | WO 04/066194 | A1 | 8/2004 |
| WO | WO 04/066693 | A1 | 8/2004 |

OTHER PUBLICATIONS

Search Report Mailed Dec. 12, 2005 for International Application No.: PCT/US2005/013943.

Davide Maltoni, "*Handbook of Fingerprint Recognition*", XP002355942 Springer, New York, USA, Jun. 2003, pp. 65-69.

Vermesan et al., "*A 500-dpi AC Capacitive Hybrid Flip-Chip CMOS ASIC/Sensor Module for Fingerprint, Navigation, and Pointer Detection With On-Chip Data Processing*", IEEE Journal of Solid State Circuits, vol. 38, No. 12, Dec. 2003, pp. 2288-2294.

Search Report Mailed Dec. 22, 2005 for European Application No. EP 05021634.0 - 2218.

International Search Report and Written Opinion mailed Jan. 30, 2006 for Application No. PCT/US2005/035504.

\* cited by examiner

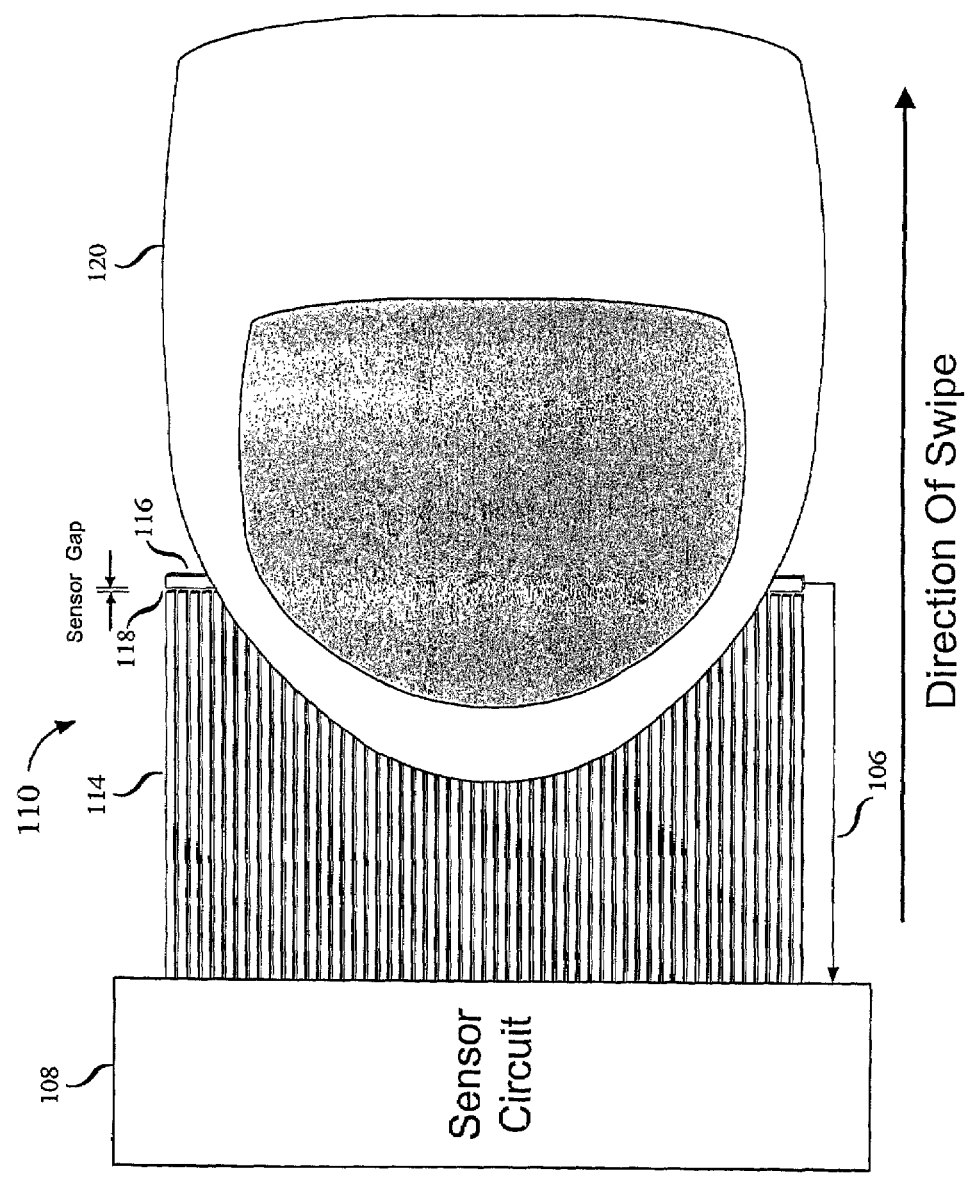

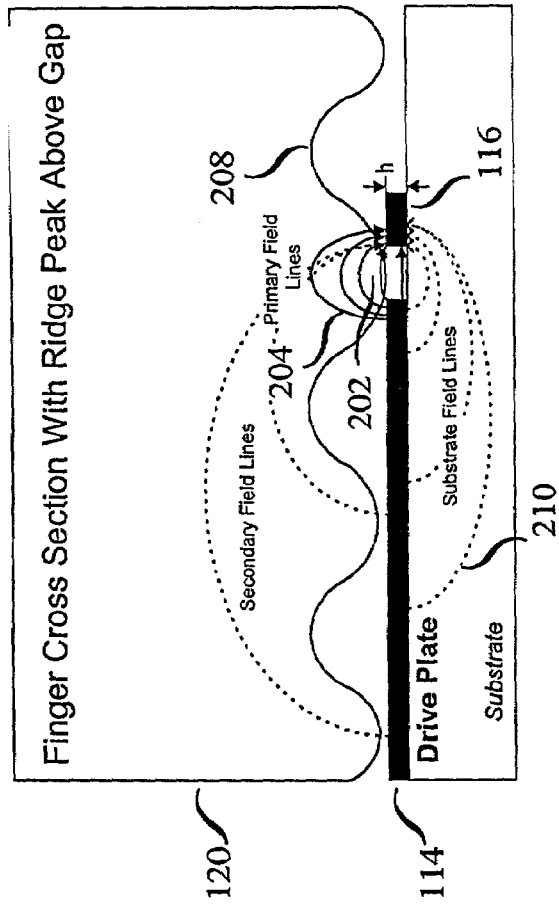
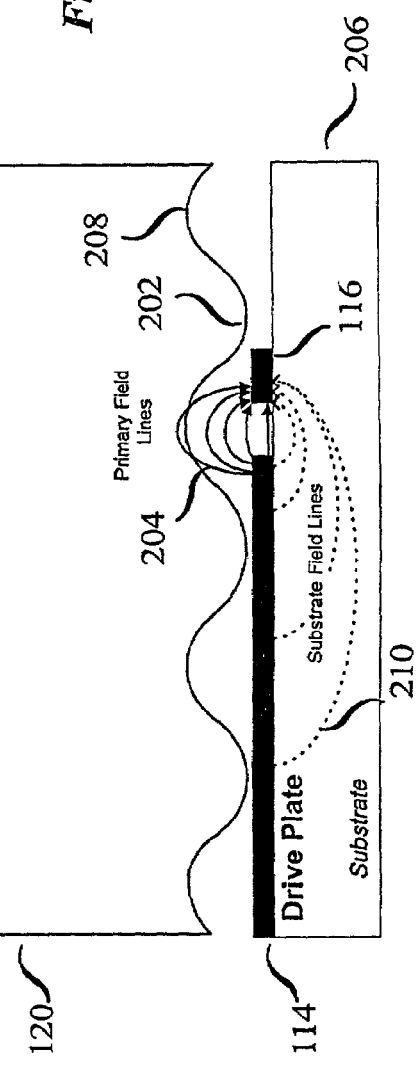
Figure 2A
Figure 2B

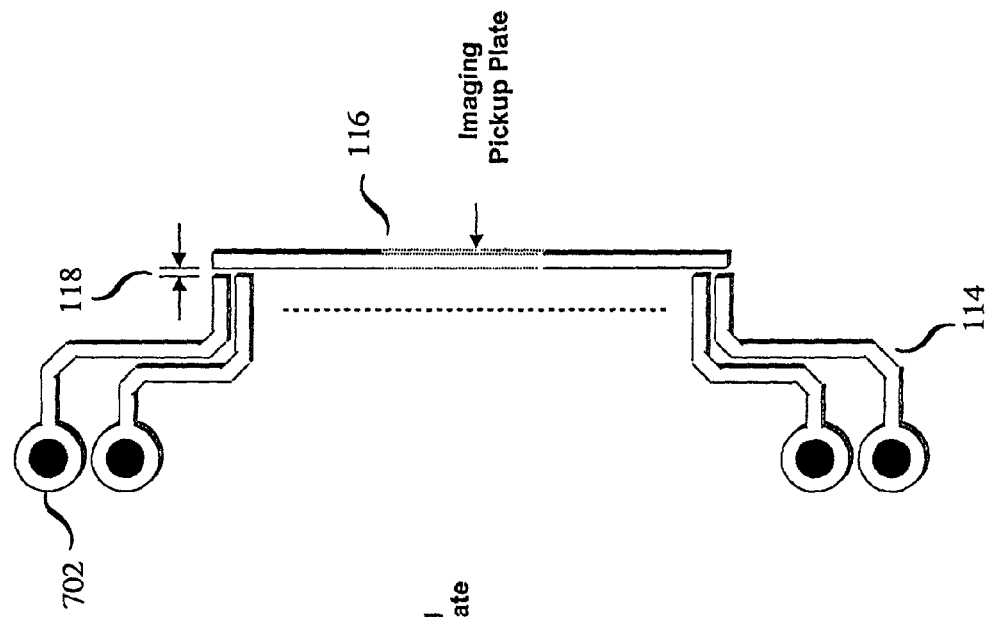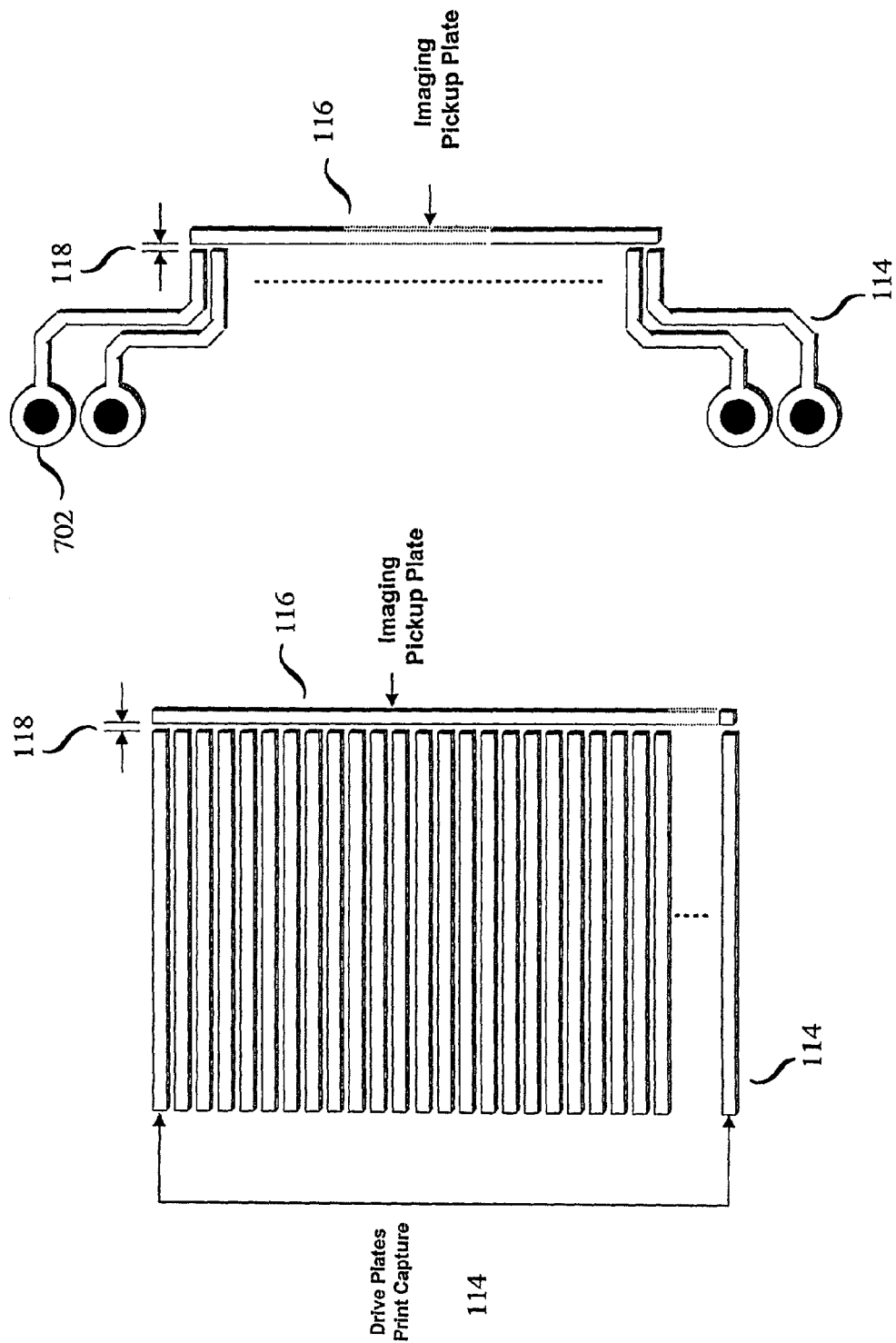

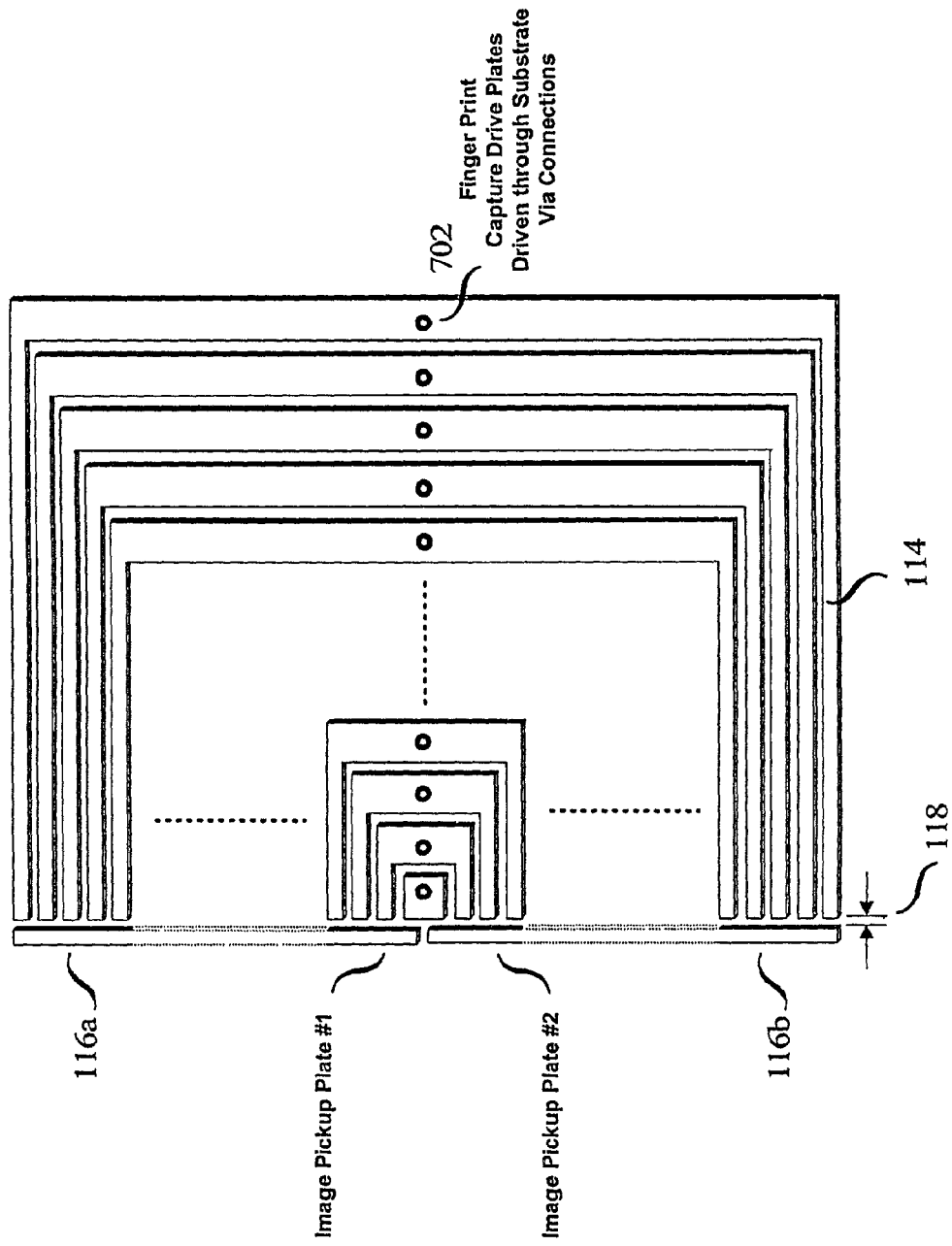

SWIPED APERTURE CAPACITIVE FINGERPRINT SENSING SYSTEMS AND METHODS

CROSS REFERENCE TO RELATED APPLICATION

This application claims the benefit of provisional application Ser. No. 60/251,371, filed Dec. 5, 2000, which is hereby incorporated by reference.

FIELD OF THE INVENTION

This invention relates to systems and methods for electronically sensing topographic features of an object, such as a fingerprint. More particularly, the invention relates to systems and methods for capacitive sensing of a fingerprint on a swiped finger.

BACKGROUND OF THE INVENTION

Electronic fingerprint sensing has received increased attention as a technique for reliable identification of individuals. Electronic fingerprint sensing may be used in stationary equipment, such as security checkpoints, or in portable devices, such as mobile phones and other wireless devices, and smart cards. Accordingly, electronic fingerprint sensing systems are required to be compact, highly reliable and low in cost.

Electronic fingerprint sensing using optical methods is well established. A simple lens-based video camera system is disclosed in U.S. Pat. No. 4,525,859 issued Jun. 25, 1985 to Bowles et al. More sophisticated units using holographic elements that project a corrected two-dimensional image onto a CCD imaging device are disclosed in U.S. Pat. No. 5,109,427 issued Apr. 28, 1992 to Yang.

More recently, electronic fingerprint sensors incorporating an array of electrodes to create a contour map of finger ridge capacitances have become popular. U.S. Pat. No. 4,353,056 issued Oct. 5, 1982 Tsikos discloses a sensor that has a two-dimensional row and column array of capacitors, each including a pair of spaced electrodes with sensing electronics, all overlaid with an insulating film. The sensor relies on the finger ridges to deform a pattern in the insulating film, thereby changing the underlying capacitance detected by the electrode array. This approach, however, requires extraordinary resiliency and durability in the polymer insulating film, which is difficult to achieve.

A more direct approach is disclosed in U.S. Pat. No. 5,325,442 issued Jun. 28, 1994 to Knapp, which discloses a two-dimensional electrode array that forms capacitors between each electrode on the substrate and a grounded finger that is placed in close proximity to the electrode. Thin film transistors located on an insulator are configured as switching elements to scan each row and column in the array. Additional circuitry measures the charging currents for each capacitor in the array as they are scanned, from which the individual capacitances are determined. These values are then used to create a two-dimensional capacitance map of the finger ridge patterns, which closely resembles the physical structure of the finger.

U.S. Pat. No. 6,016,355 issued Jan. 18, 2000 to Dickinson et al also proposes a two-dimensional matrix of electrodes on a substrate. The electrodes form an array of capacitors to a grounded finger in close proximity. This approach determines the amount of capacitance by placing a fixed voltage on each capacitor in the array and then measuring the time to discharge the capacitor with a constant current source in parallel.

All of the two-dimensional capacitive array approaches have disadvantages. First is the large number of transistor devices that are required to scan and measure the more than ten thousand capacitors in such an array at a 100 micron pitch. Even if the die area could be reduced by smaller device geometries, a large die size of at least 10 mm on a side is required to obtain sufficient contact area. Second is the problem of electrostatic discharge from a charged human body through the finger, breaking down the thin insulator that separates the finger from the sensitive electrodes and destroying the low voltage transistors that operate the array. A third problem is the risk of mechanical damage that is posed by direct physical contact of the finger to an exposed silicon die.

A fingerprint optical input apparatus including a contact image sensor for viewing a moving finger and providing an image is disclosed in U.S. Pat. No. 6,259,108 issued Jul. 10, 2001 to Antonelli et al. A linear sensor imaging method and apparatus for capturing an image of an object which moves, at an unknown variable or constant speed, past one or more linear sensor arrays is disclosed in U.S. Pat. No. 6,002,815 issued Dec. 14, 1999 Immega et al.

All of the known prior art electronic fingerprint sensing systems have had one or more disadvantages, including low reliability and high cost. Accordingly, there is a need for new and improved electronic fingerprint sensing systems and methods.

SUMMARY OF THE INVENTION

In accordance with an aspect of the invention, conductive elements, or plates, are formed on an insulating substrate to create a one-dimensional capacitive sensing array for detecting topographic variations in an object, such as a finger. The array includes multiple drive plates which are sequentially excited with short duration electronic waveform bursts. An orthogonal pickup plate connected to a charge sensing circuit sequentially detects the intensity of the electric field created by each drive element. With each complete scan of the drive plates, a one-dimensional slice of the relative dielectric constant of the object is acquired. By swiping an object such as a finger across the gap between the drive plates and the pickup plate, and scanning the gap at a much faster rate than the swipe speed, a two-dimensional image based on capacitance is generated. The image closely resembles the object's physical surface features.

According to an aspect of the invention, image sensing apparatus is provided. The image sensing apparatus comprises at least one image pickup plate disposed generally laterally with respect to a direction of movement of an object, and a plurality of image drive plates in spaced relation to the image pickup plate to define a plurality of sensor gaps. Features of the object passing over the sensor gaps produce a change in capacitance between respective image drive plates and the image pickup plate.

In some embodiments, the image pickup plate and the image drive plates are dimensioned and spaced for sensing a fingerprint. In these embodiments, the spacing between each of the image drive plates and the image pickup plate is preferably less than about one-half of the ridge spacing on a typical fingerprint, and the spacing between adjacent image drive plates is preferably less than about one-half of the ridge spacing on a typical fingerprint. In some embodiments, the image drive plates comprise parallel conductors disposed perpendicular to the image pickup plate and spaced from the image pickup plate by respective sensor gaps. In some embodiments, two or more image pickup plates are utilized, and a corresponding number of drive plates are energized simultaneously. Preferably, the image pickup plate and the image drive plates are substantially coplanar. Features of the finger passing above the sensor gaps produce changes in capacitance between respective image drive plates and the image pickup plate.

The image pickup plate and the image drive plates may comprise conductive traces on a substrate. The substrate may comprise a printed circuit board. In another embodiment, the substrate comprises a flexible substrate. The apparatus may further comprise a substrate support having a contour selected to substantially match the contour of a typical finger. The flexible substrate may be affixed to the contoured substrate support, so that the image sensor matches the shape of the finger.

The image sensing apparatus may further comprise an excitation circuit for sequentially energizing the image drive plates with image drive signals and a detection circuit for detecting the drive signals capacitively coupled from the image drive plates to the image pickup plate to provide image signals. The image drive signals may comprise sequential signal bursts supplied to respective ones of the image drive plates. The excitation circuit may include circuitry for coupling inactive image drive plates to a reference potential. The detection circuit may comprise a synchronous envelope detector for providing pulses in response to the detected signal bursts. The image sensing apparatus may further comprise and analog-to-digital converter for converting the pulses to digital values, a memory and a processor for storing the digital values in the memory. The processor may initiate a plurality of sequential line scans of the image drive plates to provide a plurality of line scans along lines of the moving object.

According to a further aspect of the invention, rate sensing apparatus is provided. The rate sensing apparatus comprises two or more object detectors spaced apart along a direction of movement of an object, each of the object detectors including at least one rate drive plate and at least one rate pickup plate. An end of an object passing over each of the object detectors produces a change in capacitance between respective rate drive plates and rate pickup plates.

Preferably, the rate drive plate and the rate pickup plate of each of the object detectors are disposed generally laterally with respect to the direction of movement of the object. In some embodiments, each of the object detectors includes first and second rate pickup plates disposed on opposite sides of the rate drive plate to form a differential rate sensor.

The rate drive plates and the rate pickup plates of the object detectors may be dimensioned and spaced for detecting the speed of a moving finger. The rate drive plates and the rate pickup plates may be curved to substantially match the curve of a typical finger end. Preferably, the rate drive plates and the rate pickup plates of the object detectors are substantially coplanar.

The rate drive plates and the rate pickup plates may comprise conductive traces on a substrate, such a printed circuit board. In a preferred embodiment, the substrate comprises a flexible substrate that may be contoured to match the contour of a typical finger.

The rate sensing apparatus may further comprise an excitation circuit for energizing the rate drive plates of the object detectors with rate drive signals and a detection circuit for detecting the drive signals capacitively coupled from the rate drive plate to the rate pickup plate of each of the object detectors to provide rate signals. The rate drive signals may comprise signal bursts. The detection circuit may comprise a synchronous envelope detector. The rate sensing apparatus may further comprise a processing circuit for determining a time delay between the rate signals from the object detectors. The time delay between the rate signals is representative of the speed of the object.

According to another aspect of the invention, a fingerprint sensing system is provided. The fingerprint sensing system comprises an image sensor including a linear array of capacitive sensors for capacitive sensing of ridge peaks and ridge valleys of a fingerprint on a moving finger, a rate sensor for sensing the speed of the finger as it moves across the image sensor, and a sensor circuit for excitation of the image sensor with image drive signals and for detection of image signals in response to the image drive signals, for excitation of the rate sensor with rate drive signals and for detection of rate signals in response to the rate drive signals, and for coordinating the image signals and the rate signals to provide a fingerprint image.

The image sensor may comprise at least one image pickup plate disposed generally laterally with respect to a direction of movement of the finger and a plurality of image drive plates in spaced relation to the image pickup to define a plurality of sensor gaps. Ridge peaks and ridge valleys of the fingerprint passing over the sensor gaps produce changes in capacitance between respective image drive plates and the image pickup plate.

The rate sensor may comprise two or more finger detectors spaced apart along the direction of movement of the finger. Each of the finger detectors may include at least one rate drive plate and at least one rate pickup plate. An end of the finger passing over each of the finger detectors produces a change in capacitance between respective rate drive plates and rate pickup plates. The sensor circuit may include a processing circuit for detecting a time delay between rate signals from the finger detectors. The time delay between the rate signals is representative of the speed of the finger.

The image sensor and the rate sensor may be fabricated on a substrate. In some embodiments, the substrate comprises a flexible substrate. In other embodiments, the sensor circuit is fabricated on the substrate with the image sensor and the rate sensor.

According to a further aspect of the invention, a capacitive sensor is provided. The capacitive sensor comprises at least one pickup plate and a plurality of drive plates in spaced relation to the pickup plate. The pickup plate and the plurality of drive plates are substantially coplanar. An object passing above the array of sensor gaps produces a change in capacitance between respective drive plates and the pickup plate.

BRIEF DESCRIPTION OF THE DRAWINGS

For a better understanding of the invention, reference is made to the accompanying drawings, which are incorporated herein by reference and in which:

FIG. 1B illustrates an embodiment of the present invention, showing a finger being swiped across a fingerprint image sensor;

FIG. 2A shows a possible electric field distribution when a ridge peak of a fingerprint is being sensed according to an embodiment of the present invention;

FIG. 2B shows the electric field distribution when a ridge valley of the fingerprint is being sensed according to an embodiment of the present invention;

FIG. 6 illustrates an image sensor according to an embodiment of the present invention;

FIG. 7 illustrates an image sensor according to another embodiment of the present invention;

FIG. 8 illustrates an image sensor according to yet another embodiment of the present invention;

DETAILED DESCRIPTION

Figure 1A:
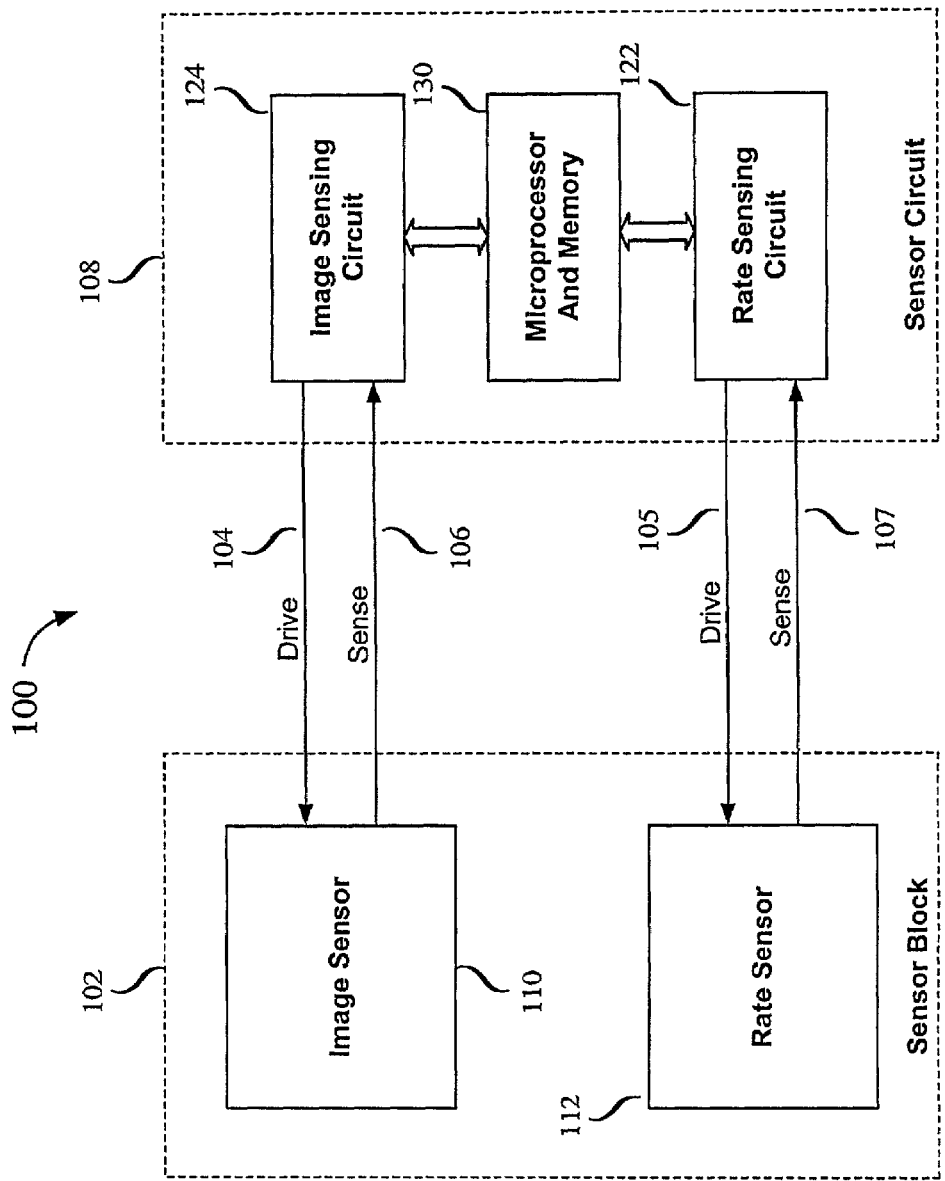
FIG. 1A is a block diagram of an image sensing system in accordance with an embodiment of the present invention.

Methods and apparatus for detecting topographic variations of an object are described herein. In one aspect of the invention, a sensor having a sensor gap, or sensor aperture, is provided. The object being sensed is swiped over the sensor. As topographic variations in the object pass over the sensor aperture, the capacitance of the aperture changes. The capacitance variations are measured. In some embodiments, the capacitance variations are stored in a computer-readable medium. The medium can later be read, the changes in capacitance can be interpreted, and an image of the topographic variations in the object can be reconstructed.

In the practice of swiped aperture sensing, an issue typically encountered is the unknown rate at which the object is swiped. This can produce distorted images. Advantageously, an embodiment of the present invention provides a rate sensor for detecting swipe speed. In embodiments of the present invention, the image is adjusted according to the sensed swipe speed.

In important embodiments, the object being sensed is a finger, and the topographic variations are ridge peaks and ridge valleys of a fingerprint. In these embodiments, the invention is implemented as a fingerprint sensing system. It should be appreciated that, while the invention is described in terms of fingerprint sensing, the invention may be adapted to detect topographic variations in other objects, and should not be considered as limited in this regard.

For ease of description, several illustrative examples are described herein in relation to the drawings. These are examples only, and are not intended to be limiting. A person of skill in the art with the benefit of this application may develop variations intended to be within the scope and spirit of this application. Throughout the drawings, like elements are indicated with like reference numerals.

FIG. 1A shows a fingerprint sensing system 100 in accordance with an embodiment of the present invention. A sensor block 102 receives drive signals from and delivers sensed signals to a sensor circuit 108. Sensor block 102 includes an image sensor 110 and a rate sensor 112. Sensor circuit 108 includes an image sensing circuit 124, a rate sensing circuit 122 and a microprocessor and memory 130. Image sensor 110 receives drive signals 104 from and delivers sensed signals 106 to image sensing circuit 124. Rate sensor 112 receives drive signals 105 from and delivers sensed signals 107 to rate sensing circuit 122. Microprocessor and memory 130 acquires and processes image data and rate data and controls the operation of the system. The components of system 100 are described in detail below.

FIG. 1B shows the practice of an embodiment of the present invention. In the embodiment shown in FIG. 1B, image sensor 110 includes multiple drive plates 114 and a pickup plate 116. Drive plates 114 are arranged substantially parallel to each other and are connected to sensor circuit 108. Pickup plate 116 is disposed substantially perpendicular to drive plates 114 and is separated from drive plates 114 by a sensor gap 118. More particularly, sensor gap 118 includes multiple sensor gaps between respective drive plates 114 and pickup plate 116. Image sensor 110 thus includes a linear array of sensor gaps.

Operation of the embodiment of FIG. 1B is now described. In FIG. 1B, a finger 120 is moved, or swiped, perpendicular to sensor gap 118. Sensor circuit 108 sequentially energizes drive plates 114 with drive signals. As ridge peaks and ridge valleys of the fingerprint on finger 120 pass over sensor gap 118, the drive signals applied to drive plates 114 are capacitively coupled to pickup plate 116 according to the capacitances of the individual sensor gaps. As described below, the capacitance varies in accordance with the ridge peaks and ridge valleys of the fingerprint passing over the sensor gaps. While a direction of swipe from left to right is indicated in FIG. 1B, it should be appreciated that a direction of swipe from right to left may also be utilized.

FIG. 2A illustrates the capacitive coupling between drive plate 114 and pickup plate 116 when a ridge peak 202 of finger 120 is within the sensor gap 118. Drive plates 114 and pickup plate 116 are affixed to an insulating substrate 206. Primary electric field lines 204 pass substantially through ridge peak 202 from drive plate 114 to pickup plate 116. Secondary field lines also pass through the body of finger 120. FIG. 2A also shows parasitic field lines that pass through substrate 206 and horizontally across gap 118.

FIG. 2B illustrates the capacitive coupling between drive plate 114 and pickup plate 116 when a ridge valley 208 of finger 120 is within sensor gap 118. As only the outer field lines of primary electric field lines 204 pass through finger 120 and many primary field lines pass through the air gap, the signal measured in this case is affected by both the bulk capacitance of the finger and the residual parasitic capacitance. The residual parasitic capacitance is the result of substrate field lines 210 passing from drive plate 114 to pickup plate 116 through substrate 206. Advantageously, an embodiment of the present invention may measure the residual parasitic capacitance prior to swiping of finger 120. That measurement is used as a correction to the value measured during fingerprint sensing.

As further shown in FIGS. 2A and 2B, drive plate 114 and pickup plate 116 have a substantially coplanar configuration on substrate 206. A thickness, h, of drive plate 114 and pickup plate 116 is typically very small in comparison with the length of each plate. Furthermore, the spacing between drive plate 114 and pickup plate 116 may be on the order of 25 to 50 micrometers for fingerprint sensing. Thus, drive plate 114 and pickup plate 116 constitute side-by-side coplanar electrodes of a capacitive sensor. The primary field lines 204 in the near field above the sensor gap constitute the primary sensing area. It will be understood that a swiped finger results in fingerprint ridges passing above the sensor gap rather than filling the sensor gap between drive plate 114 and pickup plate 116. Thus, the image sensor 110 advantageously operates as a capacitive sensor having substantially coplanar plates which sense fingerprint ridges and valleys passing above the sensor gap between drive plate 114 and pickup plate 116.

The image sensor 110 is one embodiment of a capacitive sensor having a pickup plate and a plurality of drive plates which are substantially coplanar. The capacitive sensor may be used in a variety of sensing applications. In one embodiment, the capacitive sensor is used for position sensing and/or dimension sensing of an object. Thus, an object positioned over the sensor may cover some sensor gaps and not others. As a result, the output signals of the sensor indicate the position and size of the object.

The dielectric constant of a finger is typically 10–20 times greater than the dielectric constant of the surrounding air. Dielectric constants of finger ridges vary from finger to finger and person to person; hence the wide range of dielectric constants. Since finger 120 has a dielectric constant that differs substantially from the dielectric constant of air, the capacitance between drive plate 114 and pickup plate 116 varies depending on whether a ridge peak or a ridge valley is passing over sensor gap 118. As a result, the drive signal capacitively coupled from drive plate 114 to pickup plate varies in response to the fingerprint features passing over sensor gap 118. These signal variations are used to generate an electronic image of the fingerprint.

Figure 3:
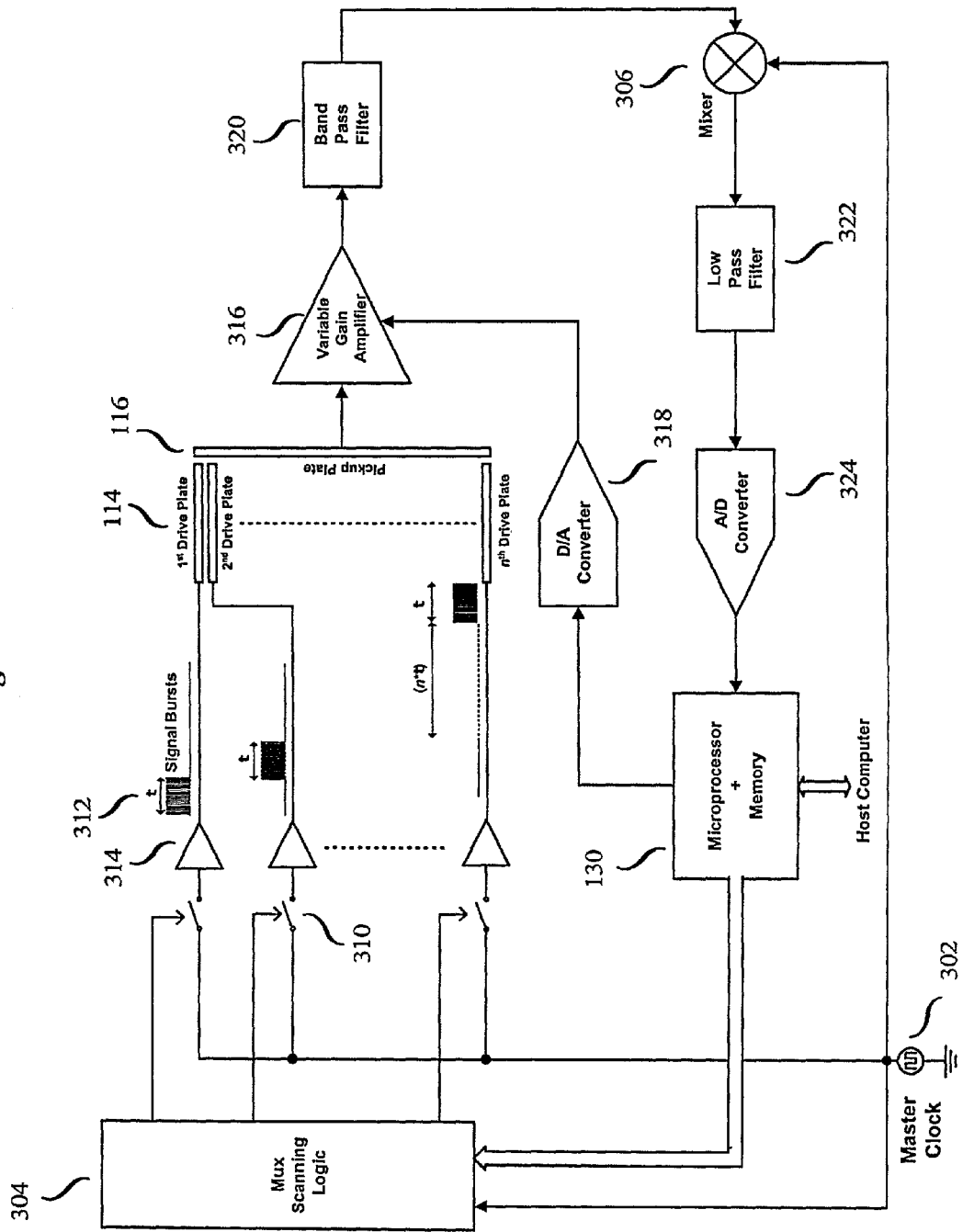
FIG. 3 is a block diagram of an image sensing circuit according to an embodiment of the present invention.

An embodiment of sensor circuit 108 is shown in FIG. 3. In particular, image sensing circuit 124 and microprocessor and memory 130 of FIG. 1A are shown in more detail. A master clock 302 provides a clock signal to mux scanning logic 304 and mixer 306. Master clock 302 can operate over a range of frequencies, for example, 20 MHz-80 MHz, but is not limited to this range. Microprocessor and memory 130 generate control signals for mux scanning logic 304. Outputs of mux scanning logic 304 serve as control inputs to switches 310.

The clock signal from master clock 302 is gated by switches 310 to provide signal bursts 312. A low impedance buffer 314 activates each drive plate 114 with signal burst 312. The signal bursts 312 are generated by standard circuit elements known to those skilled in the art and are derived from a common frequency reference of master clock 302 signal.

Mux scanning logic 304 may sequentially activate switches 310 to scan the drive plates 114. In one embodiment, master clock 302 operates at 40 MHz, and each switch 310 is gated on for about 2–5 microseconds. The sequential signal bursts 312 applied to drive plates 114 provide a linear scan of the capacitive sensors between the ends of drive plates 114 and pickup plate 116. Because the scan speed is large in comparison with the finger swipe speed, a line scan of the fingerprint is produced.

One of skill in the art will appreciate that drive plates 114 need not be driven sequentially. In fact, the drive plates 114 may be driven in any order. Further, drive plates 114 need not be driven with bursts of master clock 302 signal, but may be driven by any periodic signal, such as a sine wave.

When its control input is activated, switch 310 delivers a gated clock signal from master clock 302 to low impedance buffer 314. Signal burst 312 output by low impedance buffer 314 is capacitively coupled to pickup plate 116. As discussed above, the capacitive coupling is a function of the fingerprint features passing over the sensor gap 118. When the input to switch 310 is not activated, low impedance buffer 314 drives its connected drive plate 114 to ground. Any parasitic fields between the activated drive plate and the inactive drive plates, consequently, are shorted to ground. By capacitive coupling, pickup plate 116 detects the signal bursts 312 and provides the capacitively coupled signals to a variable gain amplifier 316.

The gain of variable gain amplifier 316 may be controlled by the output of a digital-to-analog converter 318 connected to microprocessor and memory 130. The gain may be adjusted to provide a desired output level despite variable sensing conditions. The output provided by digital-to-analog converter 318 to variable gain amplifier 316 may result in a gain adjustment based on the impedance of the finger.

The signal output from variable gain amplifier 316 is supplied to a band pass filter 320. Band pass filter 320 is centered at the frequency of master clock 302 and may have a Q of 10.

The output of band pass filter 320 is multiplied in a mixer 306 by the clock signal from master clock 302. Mixer 306 performs synchronous envelope detection of signal bursts 312. The output of mixer 306 is a baseband pulse that represents the envelope of the capacitively coupled signal burst. In an alternative embodiment, synchronous rectification may be used for envelope extraction. The amplitude of the pulse output by mixer 306 is a function of the sampled topographic feature of the finger. The pulse amplitude modulated signal is supplied to a low pass filter 322. Low pass filter 322 removes unwanted high frequency harmonics produced by the mixing process. Low pass filter 322 may have group delay characteristics that compensate for phase distortions incurred in the previous signal processing stages. Low pass filter 322 may also be optimized for processing the information coming out of the mixer at the rate at which the drive plates 114 are scanned.

An analog-to-digital converter 324 converts the output of low pass filter 322 to a digital value. Analog-to-digital converter 324 may have, for example, a resolution of 8–12 bits and is, therefore, capable of resolving the output of low pass filter 322 into, in this example, 256–4096 values.

Analog-to-digital converter 324 operates at a sufficient speed (e.g., 200 kilosamples per second) to accommodate the scanning of image sensor 110. Microprocessor and memory 130 receives the output of analog-to-digital converter 324 and stores it in a line buffer described below in connection with FIG. 18. Each stored digital value represents the capacitance between a drive plate 114 and the pickup plate 116 at the time when that drive plate was energized by signal burst 312. The capacitance is modified by the fingerprint feature that passed over the sensor gap at the time when that drive plate was energized. As a result, each stored value represents a fingerprint feature.

It should be understood that the invention is not limited to the plate driving methodology discussed in connection with FIG. 3. For example, drive plates 114 may be activated in pairs and driven differentially. In this example, at each sampling, one drive plate of the active pair is driven with a signal burst that is out of phase with the signal burst with which the other drive plate 114 of the pair is driven.

Figure 4:
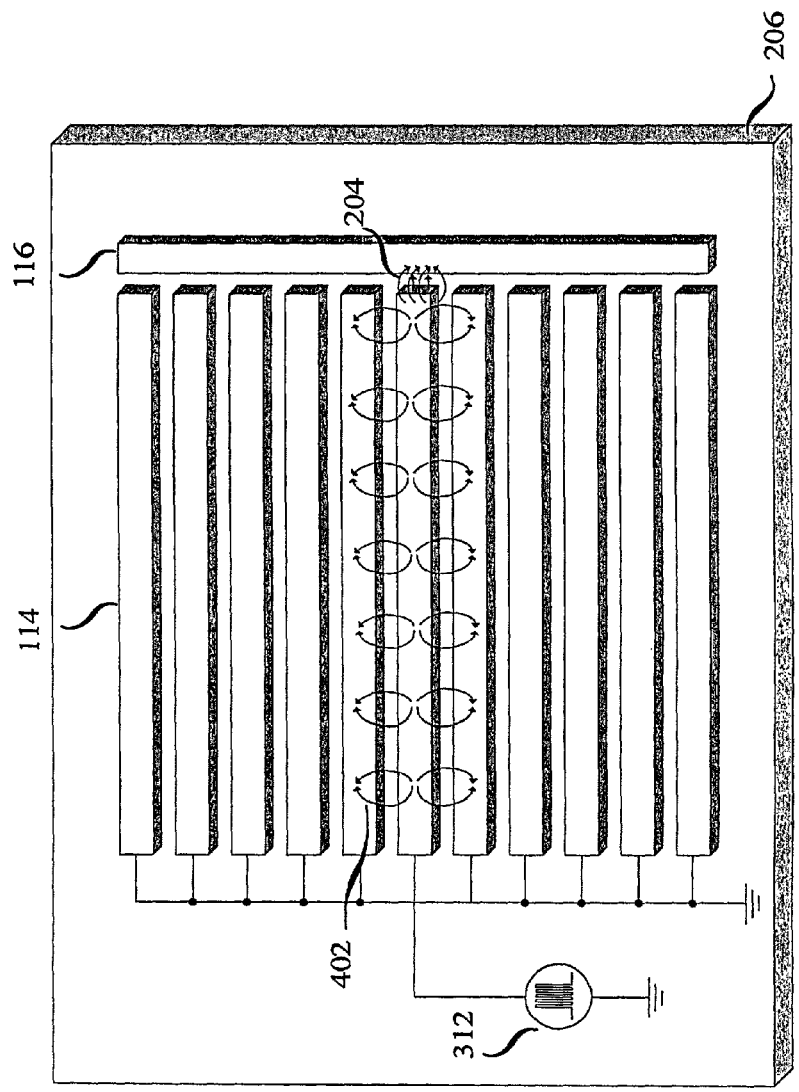
FIG. 4 is a schematic diagram of an embodiment of an image sensor, illustrating parasitic field lines that may be encountered during operation of the present invention.

Referring now to FIG. 4, a schematic representation of an embodiment of image sensor 110 is shown. The image sensor shown in the example of FIG. 4 has 11 drive plates. A practical fingerprint sensor has substantially more drive plates as described below. Primary field lines 204 and parasitic field lines 402 are shown for illustrative purposes. Signal burst 312 is shown connected to one of drive plates 114. When each drive plate 114 is driven by signal burst 312, parasitic field lines 402 are generated between the driven plate and its neighbor plates. However, since the inactive plates are connected to ground by low impedance buffers 314, parasitic field lines 402 are shorted to ground. Primary field lines 204, as noted above with respect to FIGS. 2A and 2B, are modified by the finger, resulting in detectable changes in the signal capacitively coupled to pickup plate 116.

Drive plates 114 and pickup plate 116 are formed on substrate 206. Substrate 206 can be any suitable insulating material (e.g., Capton®). In some embodiments, the substrate is flexible so that it conforms to the macro contours of an object being sensed. A flexible substrate may be affixed to a rigid substrate support, as described below in connection with FIG. 5. However, a flat substrate may be used without impairing the capabilities of the sensor. In some embodiments, the substrate 206 may be a rigid or flexible printed circuit board having drive plates 114 and pickup plate 116 formed by conventional etching or deposition processes. These embodiments provide a highly durable fingerprint sensor.

Drive plates 114 and pickup plate 116 may be formed of any conductive material, such as copper or aluminum. Drive plates 114 and pickup plate 116 may be formed on substrate 206 by any suitable process, including but not limited to etching, deposition and sputtering. Drive plates 114 and pickup plates 116 may be covered with a protective coating such as Capton®.

The width and spacing of drive plates 114 determines the resolution of the acquired fingerprint image. For example, to achieve an industry standard resolution of 500 dots per inch, the width of each drive plate 114 is approximately 25 micrometers ($\mu$m). Similarly, the gaps between adjacent drive plates 114 are 25 $\mu$m and the sensor gap 118 is 25 $\mu$m to achieve this resolution. This results in a center-to-center spacing of adjacent drive plates 114 of 50 $\mu$m.

Figure 5:
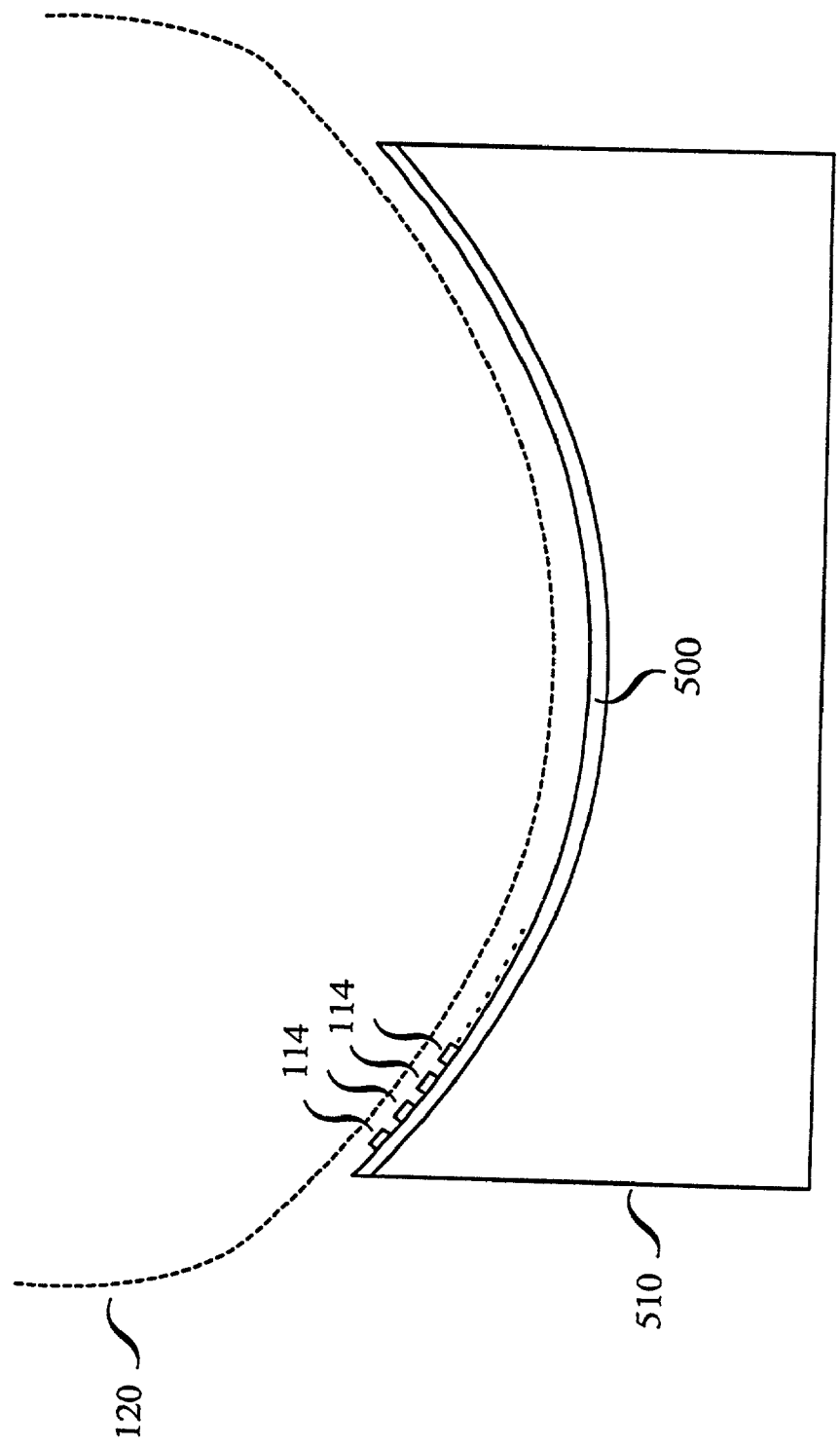
FIG. 5 illustrates an embodiment of an image sensor wherein the substrate is flexible.

FIG. 5 is a cross section of the image sensor on a flexible substrate. Drive plates 114 and pickup plate 116 (not shown in FIG. 5) are formed on a flexible substrate 500. The flexible substrate 500 is affixed to a rigid substrate support 510 having a contour that matches the contour of a typical finger. It is believed that the curved substrate 500 improves the quality of the fingerprint image.

As described above, the drive plates 114 and pickup plate 116 of image sensor 1110 are substantially coplanar. When drive plates 114 and pickup plate 116 are formed on a flexible substrate, the plates of the image sensor may be deformed from a strictly planar configuration. However in this case, drive plates 114 and pickup plate 116 maintain their side-by-side arrangement and remain substantially coplanar in a local region adjacent to the sensor gaps. That is, any curvature of the flexible substrate is small on the scale of the sensor gaps.

It should be appreciated that the substrate 206 may be attached to a finger-fitting support (not shown) such that the sensor is permanently contoured to receive a finger. Substrate 206 may also be placed on a tab protruding from the circuit board on which sensor circuit 108 is fabricated, or on any other convenient and ergonomic surface.

Several embodiments of image sensors in accordance with the present invention are described below. It should be noted that the image sensors are described herein by way of example only, and that the invention is not limited in this respect.

FIG. 6 shows a top view of one example of a sensor according to an embodiment of the present invention. Drive plates 114 are arranged substantially parallel to each other and substantially orthogonal to pickup plate 116. Drive plates 114 are separated from pickup plate 116 by sensor gap 118, over which the finger is swiped. The length of pickup plate 116 depends on the maximum fingerprint width to be scanned. The lengths of drive plates 114 are selected for convenient connection to the drive circuit.

Another embodiment of an image sensor according to the present invention is shown in FIG. 7. In FIG. 7, drive plates 114 follow different paths between pickup plate 116 and contacts 702. Contacts 702 provide connections of drive plates 114 to the drive circuit.

It should be appreciated from FIGS. 6 and 7 that drive plates 114 can be any suitable length. Drive plates 114 should preferably have an ergonomically designed length such that the finger being scanned is not impeded by other elements of the system. The image sensor design should permit a smooth and continuous swipe of the finger being scanned.

In some embodiments, components of sensor circuit 108 may be mounted on the same substrate as the sensors 110 and 112. For example, sensors 110 and 112 may be placed on the opposite side of the substrate from sensor circuit 108. In this example, contacts 702 shown in FIG. 7 provide a connection between the drive circuit and the drive plates 114 through the substrate 206.

FIG. 8 illustrates yet another embodiment of an image sensor in accordance with the present invention. The image sensor of FIG. 8 utilizes two pickup plates 116a and 116b in conjunction with substantially U-shaped drive plates 114. In this embodiment, two sensor gaps may be energized simultaneously with a single drive signal, thereby increasing the efficiency of the device. Each pickup plate 116 may require a detection circuit as shown in FIG. 3. However, the number of connections to the drive plates is reduced by one half. It will be understood that a sensor with more than two pickup plates 116 and appropriately configured drive plates 114 may be utilized.

Embodiments of rate sensor 112 are described below for illustrative purposes only. The invention should not be considered as limited to the embodiments disclosed herein.

Figure 9:
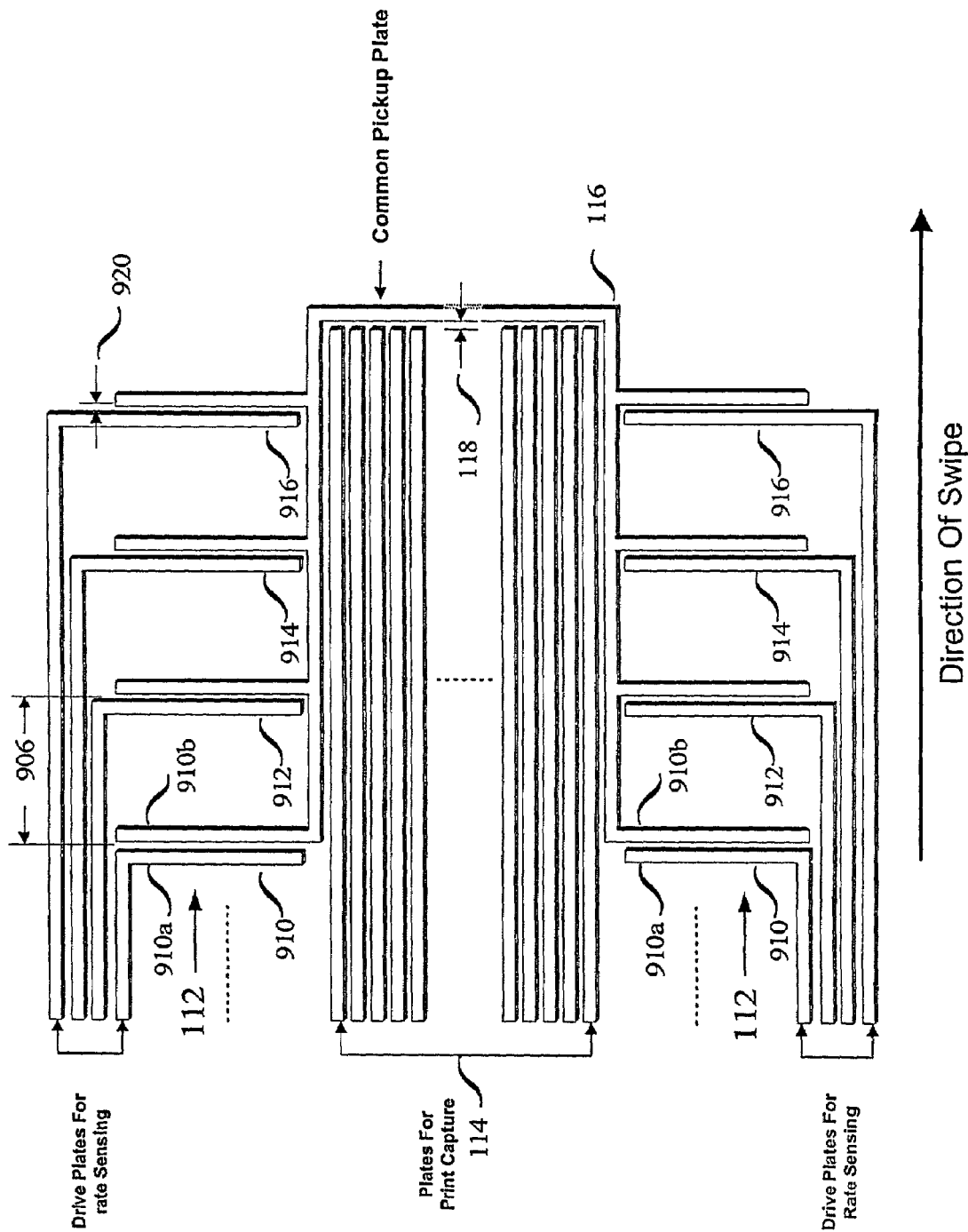
FIG. 9 illustrates a rate sensor according to an embodiment of the present invention.

FIG. 9 shows a rate sensor 112 and an image sensor 110 in accordance with an embodiment of the present invention. Image sensor 110 includes drive plates 114 and pickup plate 116 spaced from the ends of drive plates 114 by sensor gap 118, as described above in connection with FIGS. 4 and 6. The rate sensor includes two or more spaced-apart object detectors, described herein as finger detectors. Rate sensor 112 includes finger detectors 910, 912, 914 and 916. The finger detectors are spaced apart by a spacing 906 along the direction of finger swipe. The finger detectors 910, 912, 914 and 916 include portions located on opposite sides of image sensor 110 in the embodiment of FIG. 9. Each finger detector includes at least one drive plate and at least one pickup plate, which form a capacitive sensor. Thus, for example, finger detector 910 includes drive plates 910a and pickup plates 910b. The rate drive plates and the rate pickup plates are oriented substantially perpendicular to the direction of finger swipe. In the embodiment of FIG. 9, the rate pickup plates of each finger detector are connected to the pickup plate 116 of image sensor 110. The drive plates of the finger detectors maybe activated sequentially by signal bursts, as described above in connection with the image sensor. Rate sensing and image sensing may be performed at different times, such as by time multiplexing, during the fingerprint scanning process.

The rate sensor 112, rather than sensing fingerprint features, senses the end of the finger as the finger is swiped across image sensor 110. The end of the finger is easier to detect than fingerprint features, because it is a macroscopic feature. In order to sense the bulk of the finger, the gap 920 between the rate plates may be larger than the gap 118 between imaging plates. This allows the electric field lines to penetrate deeper into the finger, reducing the effect of surface features, i.e. fingerprint ridges. Initially, the finger is placed on image sensor 110 and covers all of the finger detectors 910, 912, 914 and 916. As a result, the finger detectors all sense a similar capacitance value. As the finger moves from left to right, the finger end passes finger detector 910 at time $t_1$, passes finger detector 912 at time $t_2$, passes finger detector 914 at time $t_3$ and passes finger detector 916 at time $t_4$. Passage of the finger end over each finger detector produces a distinct change in capacitance and a corresponding change in the capacitively coupled drive signal. The changes in capacitively coupled drive signals occur as rate signals at times $t_1$, $t_2$, $t_3$ and $t_4$ for finger detectors 910, 912, 914 and 916, respectively. Since the spacing between the finger detectors is known, the time delay between the rate signals indicative of the finger end is an inverse function of finger speed.

The finger detectors of the rate sensor 112 are located only on the side of the sensor gap 118 of image sensor 110 from which direction the finger is swiped across the sensor gap. The finger detectors are designed to cover an area of the finger from the furthest ridge desired to be imaged to the end of the finger. The presence or absence of a finger can be detected by measuring the change in the bulk capacitance produced by the finger end as it passes each finger detector. By recording the times of these transitions, such as times $t_1$, $t_2$, $t_3$ and $t_4$, a time history of finger position can be determined. The time history can be used to compute a finger velocity profile. The granularity of the velocity profile depends on the number of finger detectors and the spacing between finger detectors. Preferably, the spacing between finger detectors is a minimum of the width of three finger ridges, or approximately 0.035 to 0.050 inch.

Figure 10:
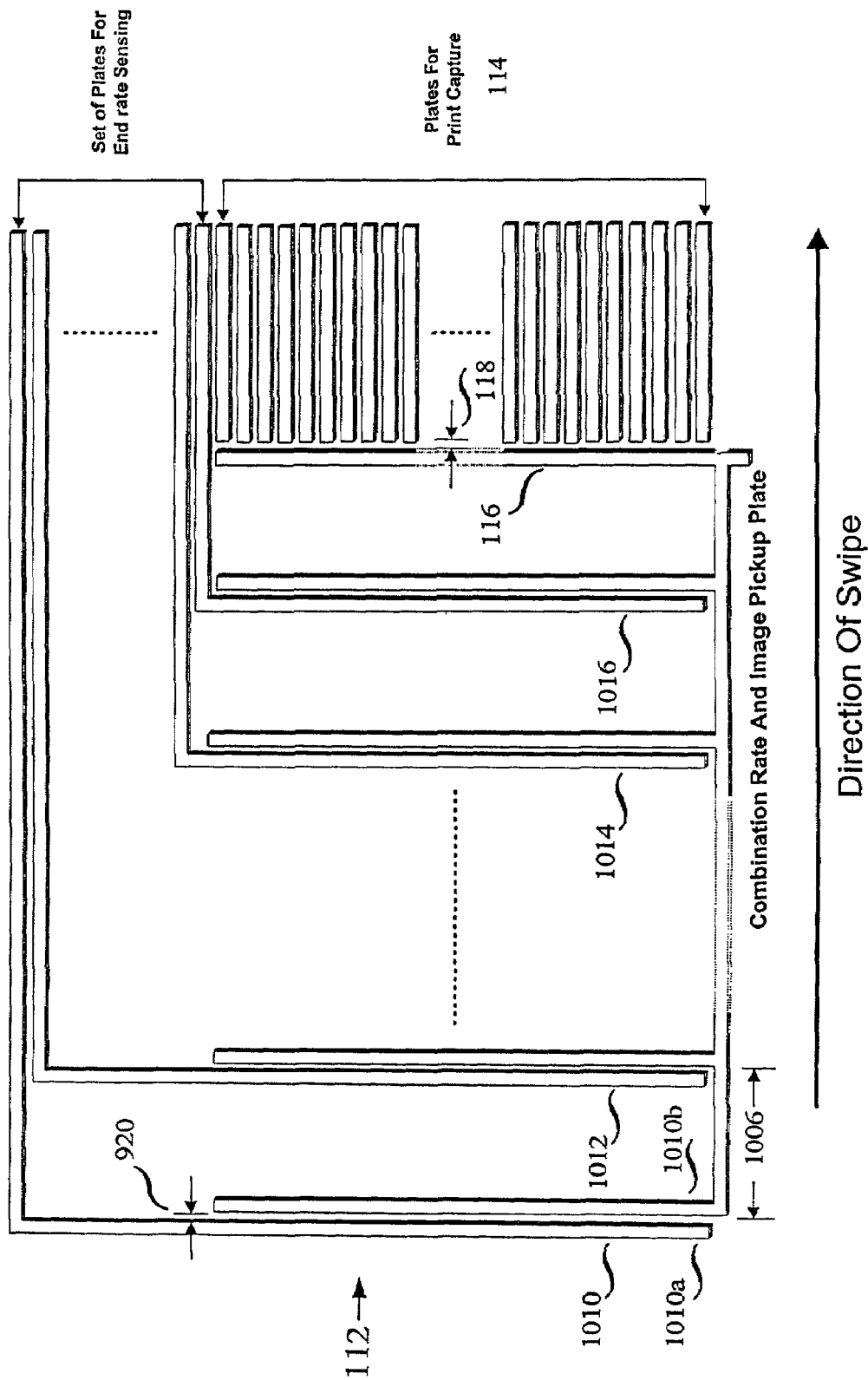
FIG. 10 illustrates a rate sensor according to another embodiment of the present invention.

A second embodiment of rate sensor 112 is shown in FIG. 10. In this embodiment, the orientation of image sensor 110 is reversed with respect to the direction of finger swipe. Rate sensor 112 is located on the opposite side of image sensor pickup plate 116 from drive plates 114. This configuration permits the rate drive plates and rate pickup plates to extend across the entire width of the sensor, thereby providing larger sensed signals. As shown in FIG. 10, rate sensor 112 includes finger detectors 1010, 1012, 1014 and 1016 spaced apart along the direction of finger swipe by a spacing 1006. Each of the finger detectors includes at least one rate drive plate and one rate pickup plate. Thus, for example, finger detector 1010 includes rate drive plate 1010a and rate pickup plate 1010b. The rate pickup plates of each of the finger detectors 1010, 1012, 1014 and 1016 are connected to the pickup plate 116 of image sensor 110. In other embodiments, the rate pickup plate and the image pickup plate can be electrically isolated and connected to separate sensing circuits.

Figure 11:
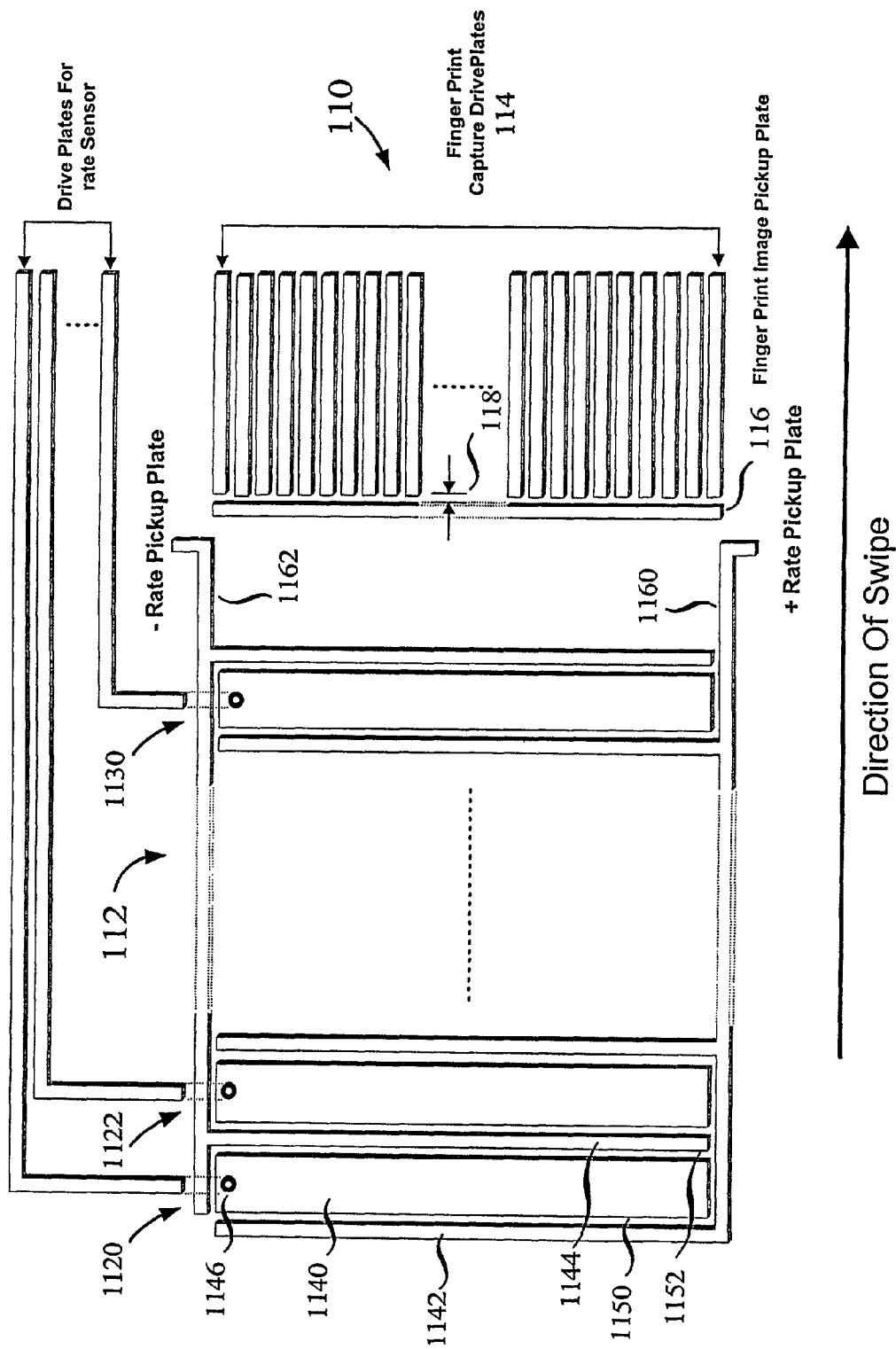
FIG. 11 illustrates a rate sensor according to yet another embodiment of the present invention.

A third embodiment of rate sensor 112 is shown in FIG. 11. The embodiment of FIG. 11 uses differential rate sensing. Rate sensor 112 includes finger detectors 1120, 1122, . . . 1130 positioned along the direction of finger swipe. Each of the finger detectors has a differential configuration. In particular, each finger detector includes a drive plate and first and second pickup plates located on opposite sides of the drive plate. For example, finger detector 1120 includes a drive plate 1140 and pickup plates 1142 and 1144 located on opposite sides of drive plate 1140. Pickup plate 1142 is spaced from drive plate 1140 by sensor gap 1150, and pickup plate 1144 is spaced from drive plate 1140 by sensor gap 1152. Drive plate 1140 and pickup plates 1142 and 1144 may be elongated conductors oriented perpendicular to the direction of finger swipe across the image sensor 110. In the embodiment of FIG. 11, drive plate 1140 is wider than pickup plates 1142 and 1144 and is connected to a drive circuit via a contact 1146. Preferably, the differential finger detector has a symmetrical configuration, so that the capacitively coupled signals to pickup plates 1142 and 1144 are equal when a finger is not present or when a finger covers both rate sensor gaps 1150 and 1152. The other fingers detector may have a similar construction. In the embodiment of FIG. 11, the first pickup plates of the finger detectors are commonly connected to pickup line 1160, and the second pickup plates of the finger detectors are commonly connected to pickup line 1162.

As the end of the finger is swiped across the sensor gaps 1150 to 1152, a capacitance versus time profile can be created that has a large peak value due to a capacitance imbalance between pickup plates 1142 and 1144 of finger detector 1120 when the end of the finger has just crossed the first sensor gap 1150 but has not yet crossed the second sensor gap 1152. A differential signal peak is produced sequentially between first sensor gap 1150 and the second sensor gap 1152 as the finger detector 1120 is activated by its associated differential drive plate 1140, while the end of the finger passes. In one embodiment, as soon as the differential signal peak is detected in one finger detector 1120, the next adjacent finger detector 1122 is activated. This sequence continues until a differential signal peak has been detected by the last finger detector 1130.

Figure 12:
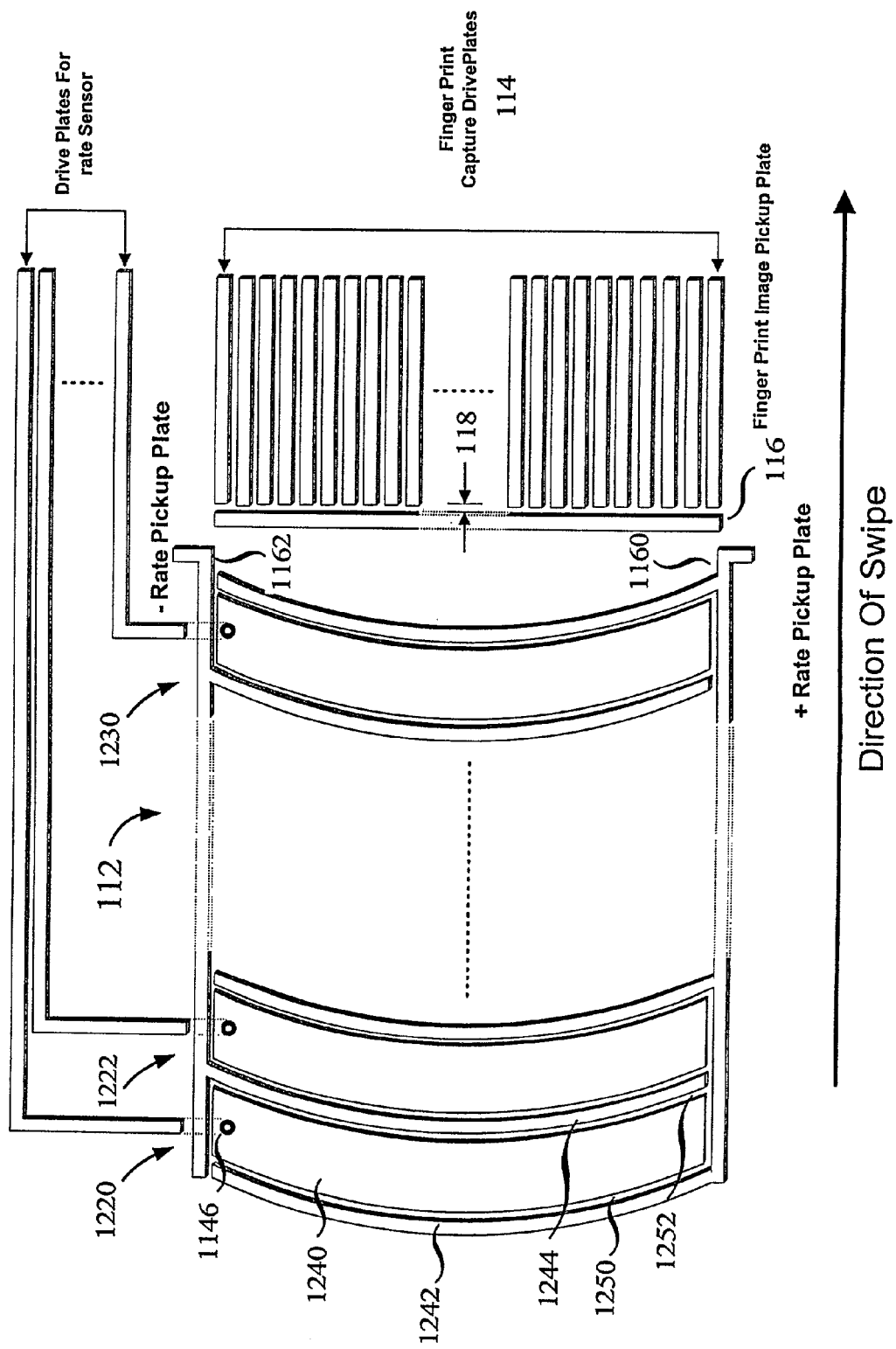
FIG. 12 shows a rate sensor according to a further embodiment of the present invention.

FIG. 12 illustrates another embodiment of the differential rate sensor shown in FIG. 11. The differential rate sensor shown in FIG. 12 is similar to the differential rate sensor shown in FIG. 11 and described above, except that the drive plates and the pickup plates of each finger detector are curved to match the contour of a typical finger end. In particular, rate sensor 112 includes differential finger detectors 1220, 1222, . . . 1230. Finger detector 1220 includes a curved drive plate 1240 and curved pickup plates 1242 and 1244 located on opposite sides of drive plate 1240. Pickup plate 1242 is spaced from drive plate 1240 by sensor gap 1250, and pickup plate 1244 is spaced from drive plate 1240 by sensor gap 1252. The remaining finger detectors have a similar construction. The curved plates of the finger detectors improve the signal-to-noise ratio of the differential rate sensor. It will be understood that different curvatures and shapes of the drive plates and pickup plates may be utilized for sensing objects other than fingers.

Figure 13:
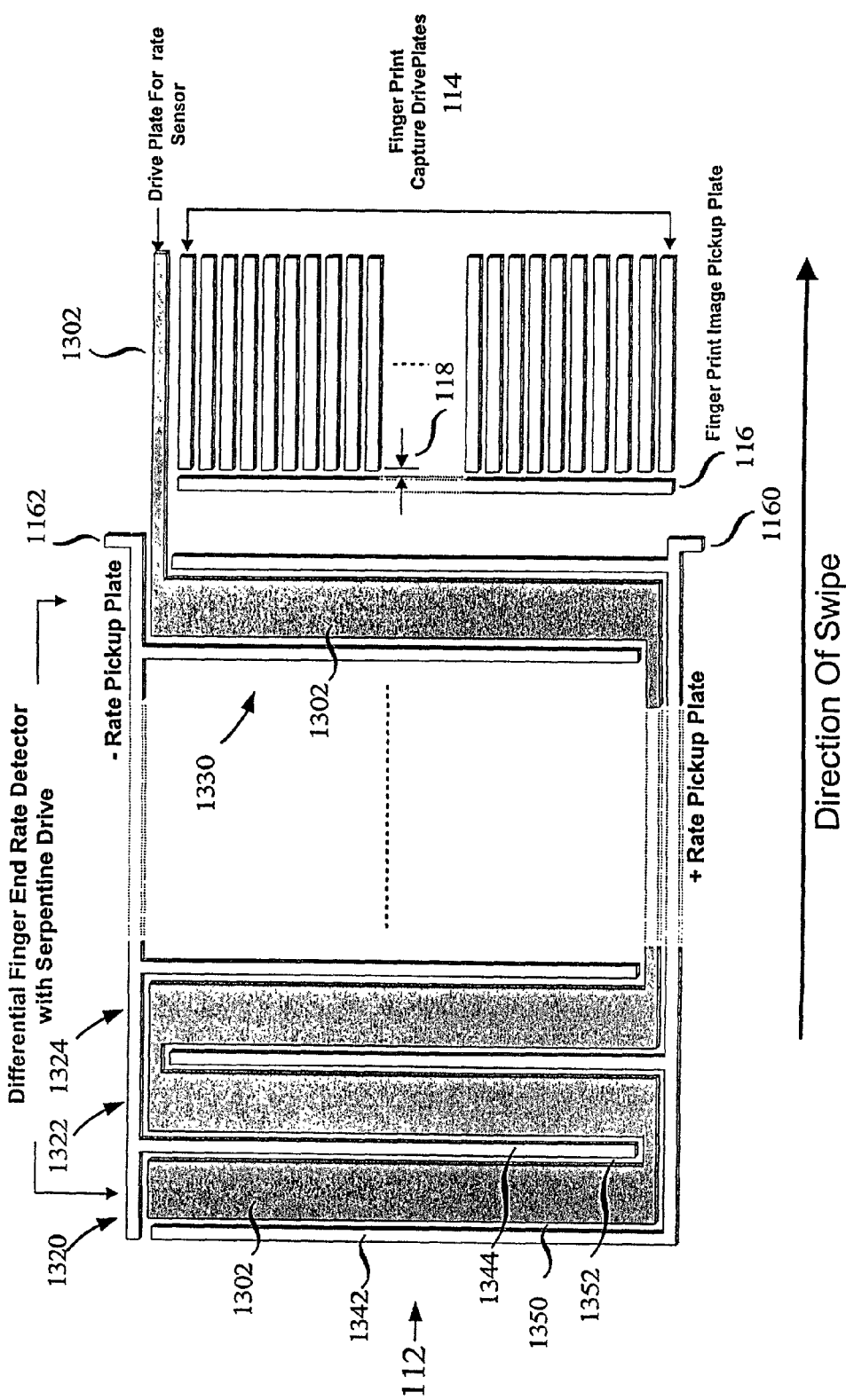
FIG. 13 shows a rate sensor according to another embodiment of the present invention.

Another embodiment of a differential rate sensor is shown in FIG. 13. In this embodiment, a single drive plate 1302 has a serpentine configuration between a comb-like array of pickup plates. In other respects, rate sensor of FIG. 13 is similar to the differential rate sensor of FIG. 11. Referring to FIG. 13, differential rate sensor 112 includes differential finger detectors 1320, 1322, 1324, . . . 1330. Each finger detector includes first and second pickup plates positioned on opposite sides of the respective drive plate. For example, finger detector 1320 includes a section of serpentine drive plate 1302 and pickup plates 1342 and 1344 positioned on opposite sides of that section of drive plate 1302. Pickup plate 1342 is spaced from drive plate 1302 by sensor gap 1350, and pickup plate 1344 is spaced from drive plate 1302 by sensor gap 1352. The remaining finger detectors have a similar construction. In the embodiment of FIG. 13, a common serpentine drive plate is utilized. In addition, the first pickup plates of the finger detectors are commonly connected, and the second pickup plates of the finger detectors are commonly connected.

As a finger is initially swiped across the differential rate sensor of FIG. 13, all the finger detectors 1320, 1322, 1324, . . . 1330 are covered by dielectric and no net differential signal is produced in the pickup plates 1342 and 1344. As soon as the end of the finger swipes past the first sensor gap 1350 and is between the first sensor gap 1350 and the second sensor gap 1352, a net differential signal appears on the pickup plates 1342 and 1344. This phenomenon is repeated as the end of passes the next finger detector 1322 until the end of the finger reaches the last finger detector 1330.

Figure 14:
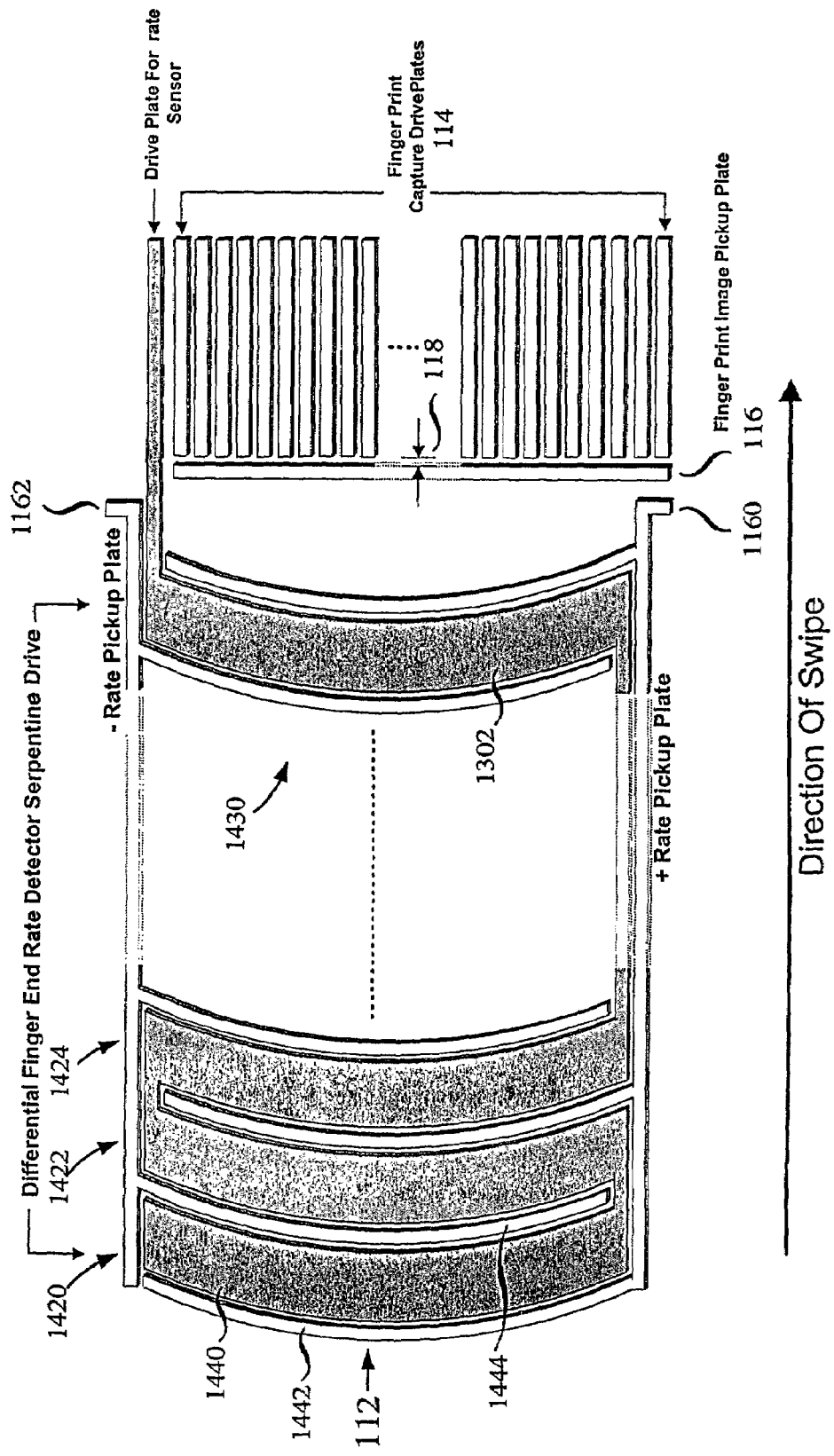
FIG. 14 shows a rate sensor according to yet another embodiment of the present invention.

Another embodiment of the rate sensor 112 is shown in FIG. 14. The embodiment of FIG. 14 is similar to the embodiment of FIG. 13, except that the drive plates and the pickup plates of each finger detector are curved to match a typical finger end. In particular, rate sensor 112 includes finger detectors 1420, 1422, 1424, . . . 1430. Each finger detector includes a curved drive plate and first and second pickup plates located on opposite sides of the drive plate. For example, finger detector 1420 includes curved drive plate 1440 and curved pickup plates 1442 and 1444 on opposite sides of drive plate 1440.

In each embodiment of the rate sensor, the drive plates and the pickup plates of each finger detector are preferably coplanar. Furthermore, the rate sensor and the image sensor can be fabricated on a single substrate so that the image drive plates and the image pickup plate of the image sensor and the rate drive plates and the rate pickup plates of the rate sensor are all substantially coplanar.

Figure 15:
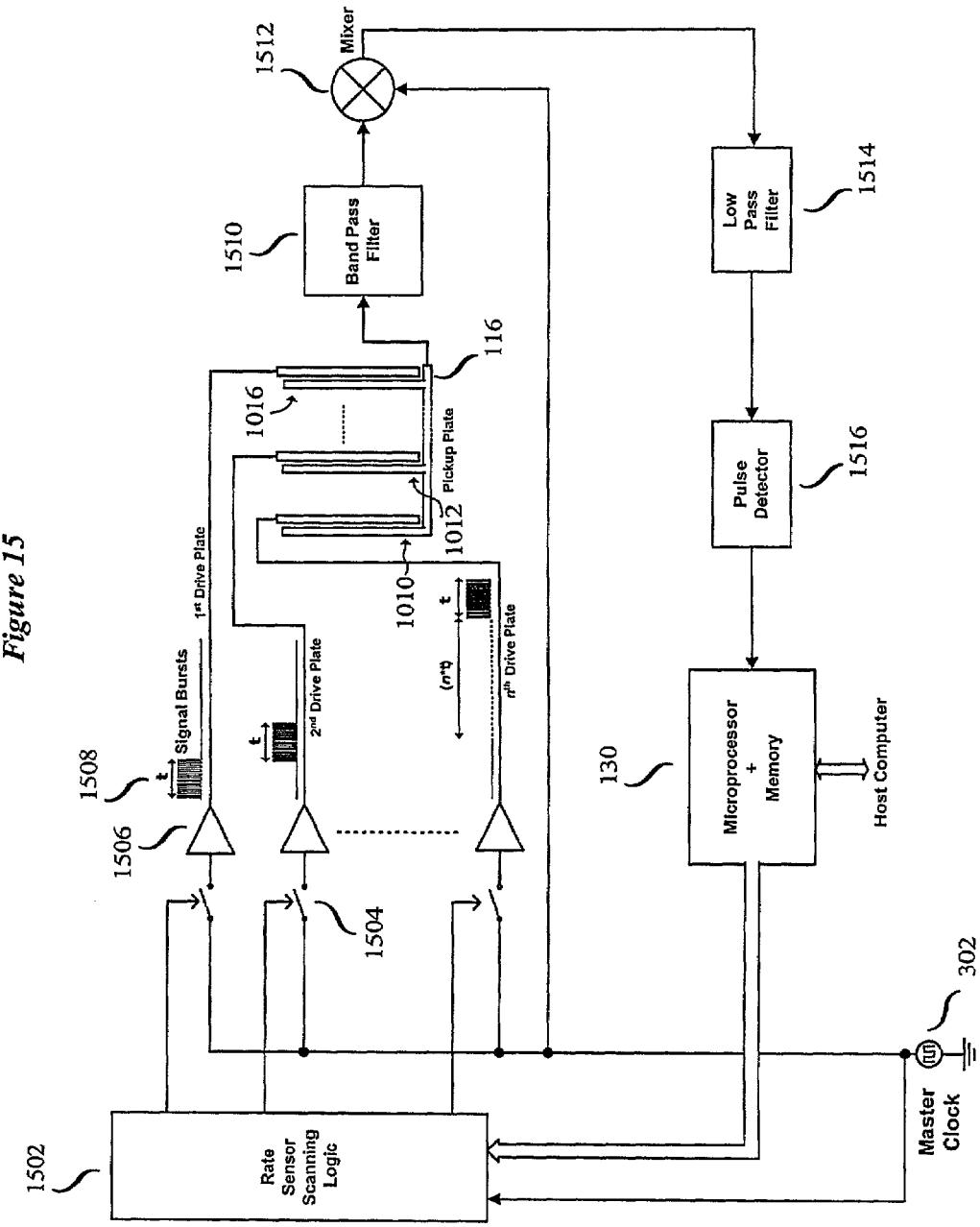
FIG. 15 is a block diagram of a rate sensing circuit according to an embodiment of the present invention.

FIG. 15 is a block diagram of an embodiment of rate sensing circuit 122 (FIG. 1A) and microprocessor and memory 130 for deriving rate information from the rate sensor embodiments of FIGS. 9 and 10. Rate sensor mux scanning logic 1502 sequentially asserts its output lines in response to signals from microprocessor and memory 130. In response to an asserted output signal from rate sensor mux scanning logic 1502, a switch 1504 closes, thereby gating the clock signal from master clock 302 to a low impedance buffer 1506. A signal burst 1508, derived from the clock signal, is output from the selected switch 1504 and passes through buffer 1506 to the drive plate of one of the finger detectors 1010, 1012, . . . 1016.

In the embodiments shown in FIGS. 9 and 10, pickup plate 116 serves as an image sensor pickup plate and as a rate sensor pickup plate. The output of pickup plate 116 is supplied to a band pass filter 1510. Band pass filter 1510 has a center frequency of the clock signal. The filtered signal is provided to a mixer 1512, where it is multiplied by the clock signal. As described in connection with FIG. 3, the mixer functions as a synchronous envelope detector. The pulse amplitude modulated signal output by mixer 1512 is supplied through a low pass filter 1514 to a pulse detector 1516. Pulse detector 1516 supplies a trigger signal to a rate sensor event timer 1818, shown in FIG. 18. The pulse detector 1516 may be implemented as a comparator with a threshold that is programmed by the microprocessor, or in software by sampling the rate sensor output with an analog-to-digital converter and comparing the result to a digital threshold. The threshold of pulse detector 1516 is adjusted to generate an output trigger signal when the finger end passes each of the finger detectors.

Figure 16:
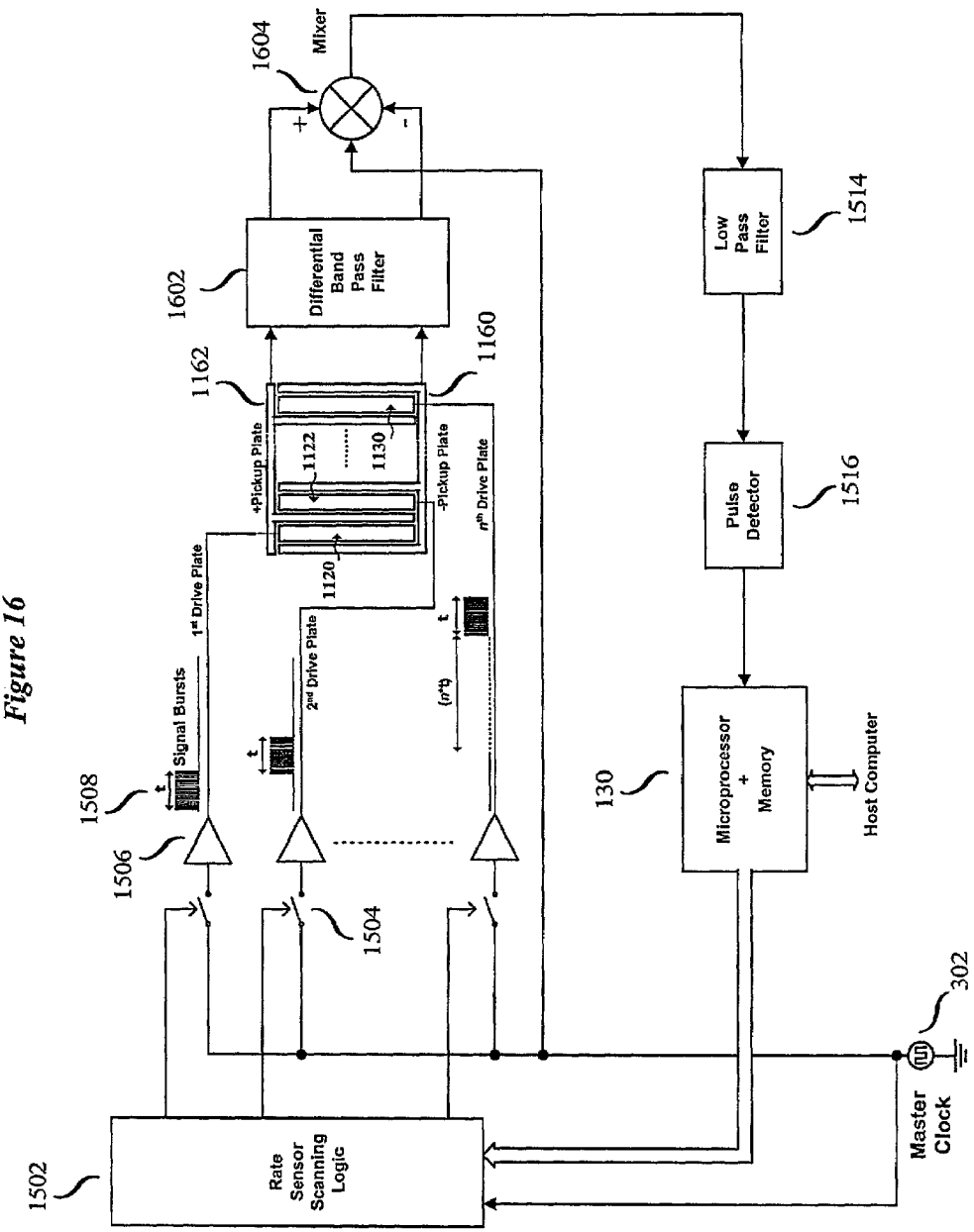
FIG. 16 is a block diagram of a rate sensing circuit according to another embodiment of the present invention.

FIG. 16 is a block diagram of an embodiment of rate sensing circuit 122 (FIG. 1A) and microprocessor and memory 130 for deriving rate information from the differential rate sensor embodiments of FIGS. 11 and 12. The rate sensing circuit of FIG. 16 differs from the rate sensing circuit of FIG. 15 in that the differential rate sensor has a differential output. In particular, the commonly connected pickup lines 1160 and 1162 of finger detectors 1120, 1122, . . . 1130 are connected to a differential band pass filter 1602. The outputs of band pass filter 1602 are connected to inputs of a differential mixer 1604. Mixer 1604 multiples the differential inputs by the clock signal to obtain a baseband pulse that represents the envelope of the capacitively coupled signal bursts. As in the embodiment of FIG. 15, mixer 1604 functions as a synchronous envelope detector. The output of mixer 1604 is supplied through low pass filter 1514 to pulse detector 1516 for determining rate information as described above.

Figure 17:
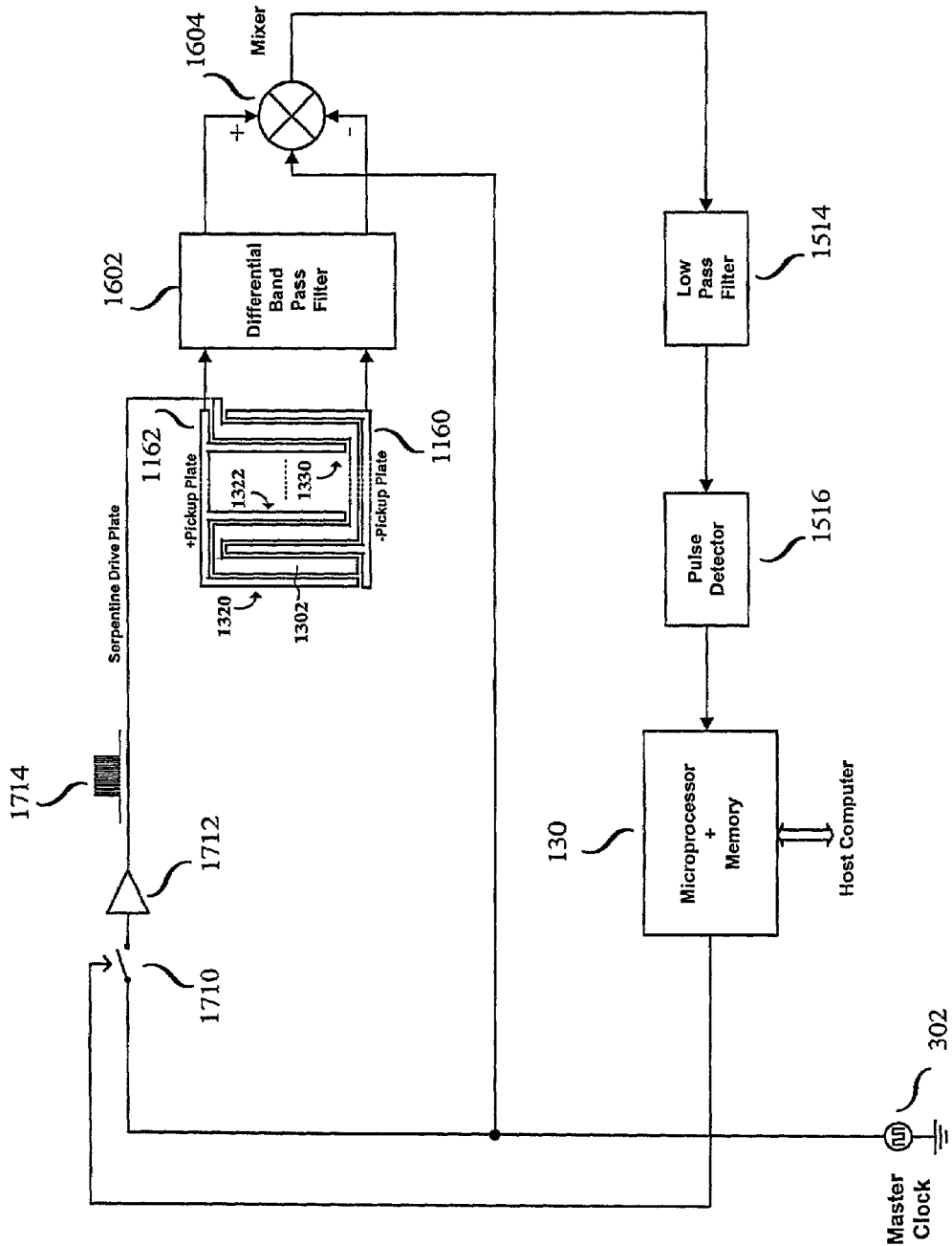
FIG. 17 is a block diagram of a rate sensing circuit according to yet another embodiment of the present invention.

FIG. 17 is a block diagram of an embodiment of rate sensing circuit 122 (FIG. 1A) and microprocessor and memory 130 deriving rate information from the differential rate sensor embodiments of FIGS. 13 and 14. As described above, the embodiments of FIGS. 13 and 14 utilize a single drive plate having a serpentine configuration. The rate sensing circuit of FIG. 17 differs from the rate sensing circuit of FIG. 16 in that a single drive circuit is required for the serpentine drive plate 1302. A single switch 1710 gates the clock signal, in response to a control signal from microprocessor and memory 130, through a buffer 1712 to supply a signal burst 1714 to serpentine drive plate 1302. The outputs of the rate sensor on pickup lines 1160 and 1162 are provided to differential band pass filter 1602 as in the embodiment of FIG. 16.

It will be understood that the rate sensing circuit may use the same master clock as the image sensing circuit or a different clock having a different frequency that is selected to optimize rate sensing.

Figure 18:
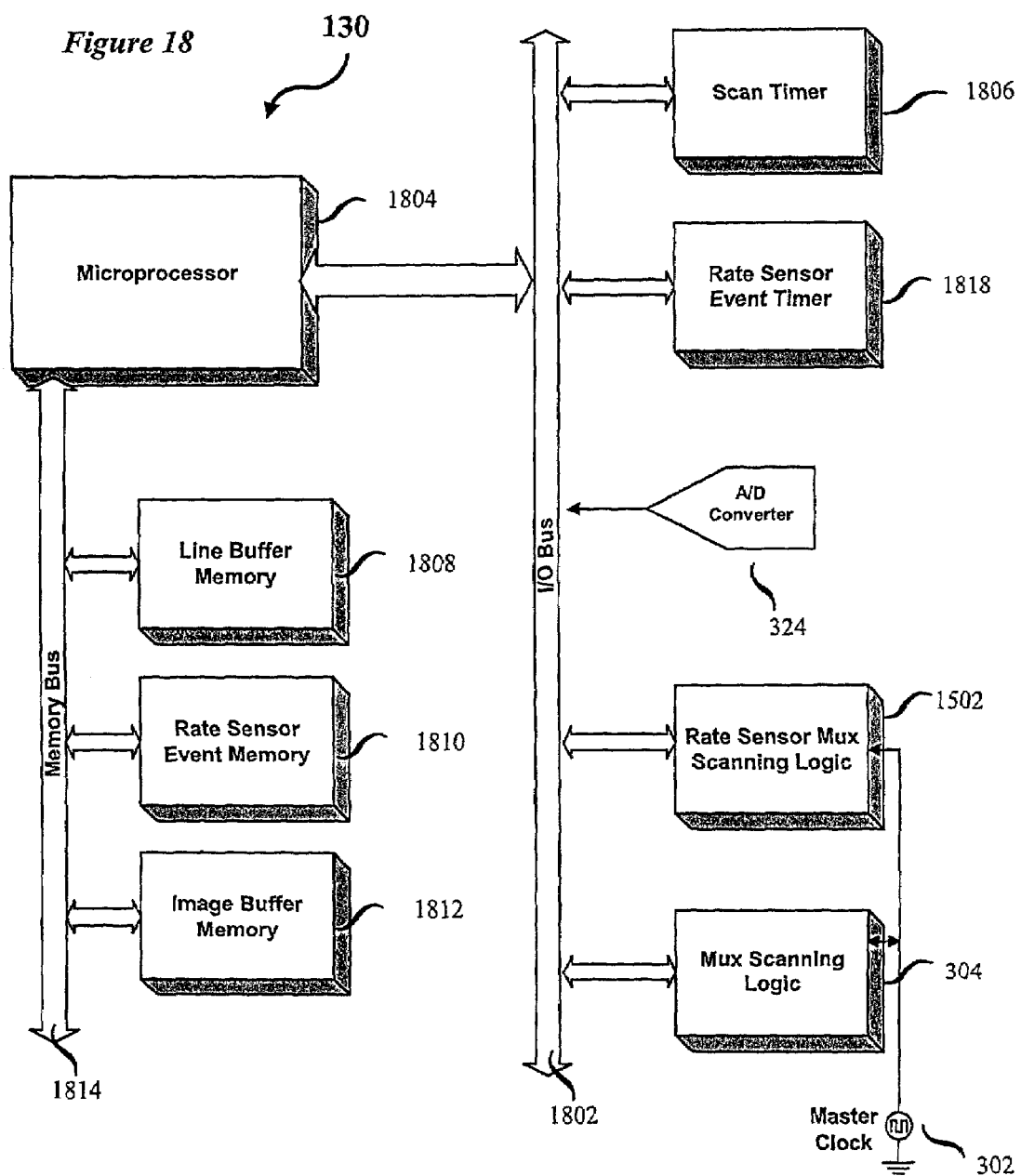
FIG. 18 is a block diagram of a data acquisition and control processor in accordance with an embodiment of the present invention.

FIG. 18 is a block diagram of a data acquisition and control processor in accordance with an embodiment of the invention. Microprocessor and memory 130 and its connection to the image sensing circuit and the rate sensing circuit are shown in FIG. 18. Microprocessor and memory 130 may include a microprocessor 1804 connected by a memory bus

1814 to a line buffer 1808, a rate sensor event memory 1810 and an image buffer memory 1812. Line buffer memory 1808 may store image data for a single line scan of the image sensor. Image buffer memory 1812 may store one or more entire fingerprint images. Rate sensor event memory 1810 may store finger detector numbers and rate sensor event times for determining finger speed. Microprocessor 1804 may be connected by an I/O bus 1802 to mux scanning logic 304 (FIG. 3) of the image sensing circuit and A/D converter 324 of the image sensing circuit. Microprocessor 1804 may further be connected via I/O bus 1802 to rate sensor mux scanning logic 1502 of the rate sensing circuit (FIG. 15) and to rate sensor event timer 1818, which determines the time delay between rate sensor events. A scan timer 1806 connected to I/O bus 1802 is used to initiate line scan sequences.

Figure 19:
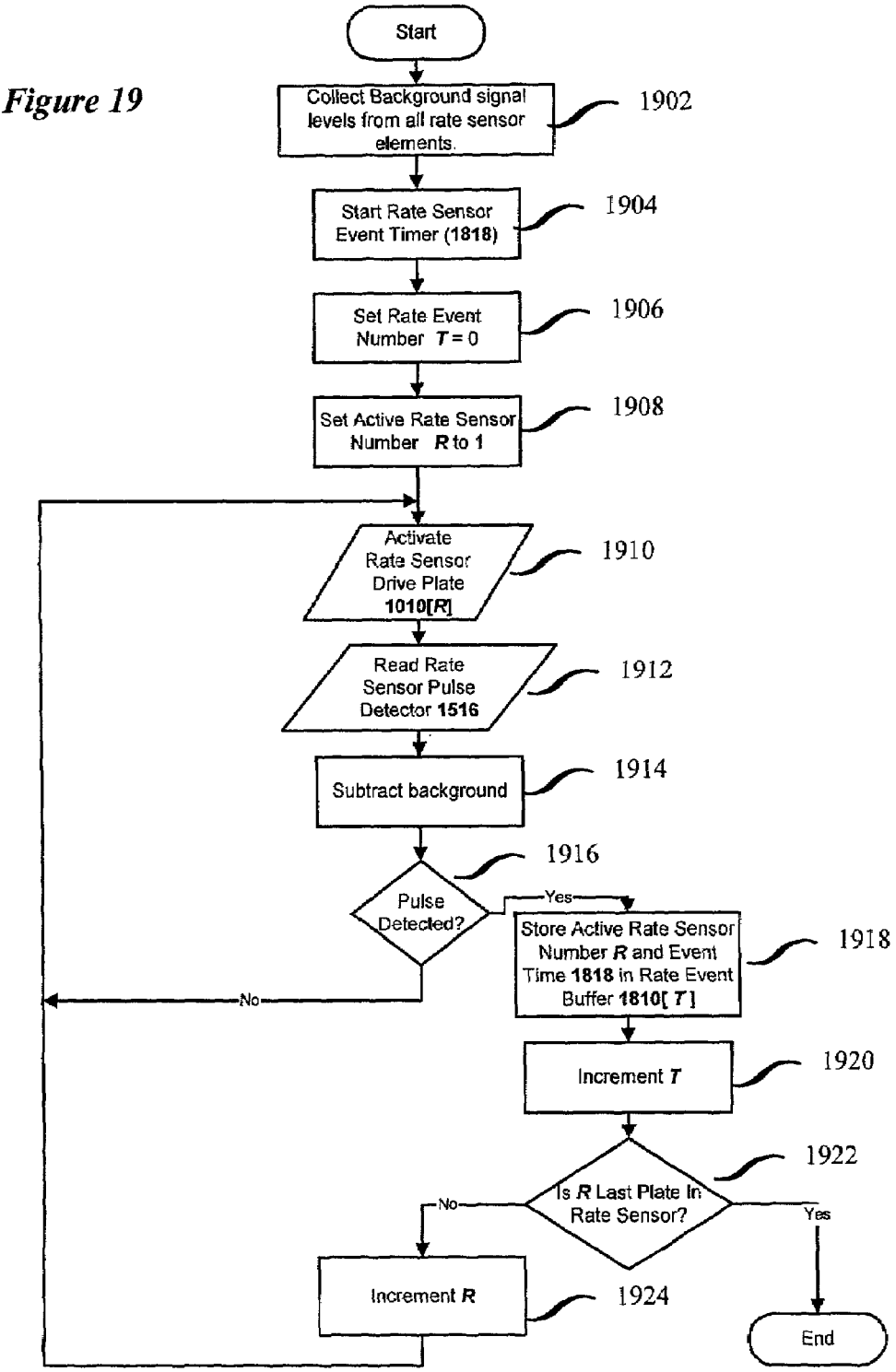
FIG. 19 is a flow chart of a rate sensing algorithm according to an embodiment of the present invention.

FIG. 19 is a flow diagram of an embodiment of a rate sensor method for use with the single-ended rate sensor embodiments of FIGS. 9 and 10 and the rate sensing circuit of FIG. 15. In step 1902, background signal levels from each rate sensor finger detector are collected. In step 1904, the rate sensor event timer 1818 (FIG. 18) is started. Then, in step 1906, a rate event number T is set to zero. An active rate sensor number R is set to 1 in step 1908. The finger detector corresponding to the active rate sensor number R is activated in step 1910. After the capacitively coupled drive signal is detected and processed, the pulse detector 1516 output is read in step 1912, and the background signal level is subtracted in step 1914. If a pulse is detected step 1916, the active finger detector number and event time are stored in the rate event buffer 1810 shown in FIG. 18. In step 1920, the rate event number T is incremented. If the active finger detector is determined in step 1922 to be the last finger detector in the rate sensor, the method exits. If the active finger detector is not the last finger detector, the active rate sensor number R is incremented in step 1924, and the method returns to step 1910 for continued execution. If a pulse was not detected in step 1916 the method returns to step 1910 for continued execution.

It will be understood that the method of FIG. 19 scans each finger detector of the rate sensor sequentially until a single transition is detected, and then proceeds to the next finger detector. In other embodiments, the method may scan all finger detectors, and determine if there are transitions on any of the finger detectors. This advantageously provides detection of missed transitions.

Figure 20:
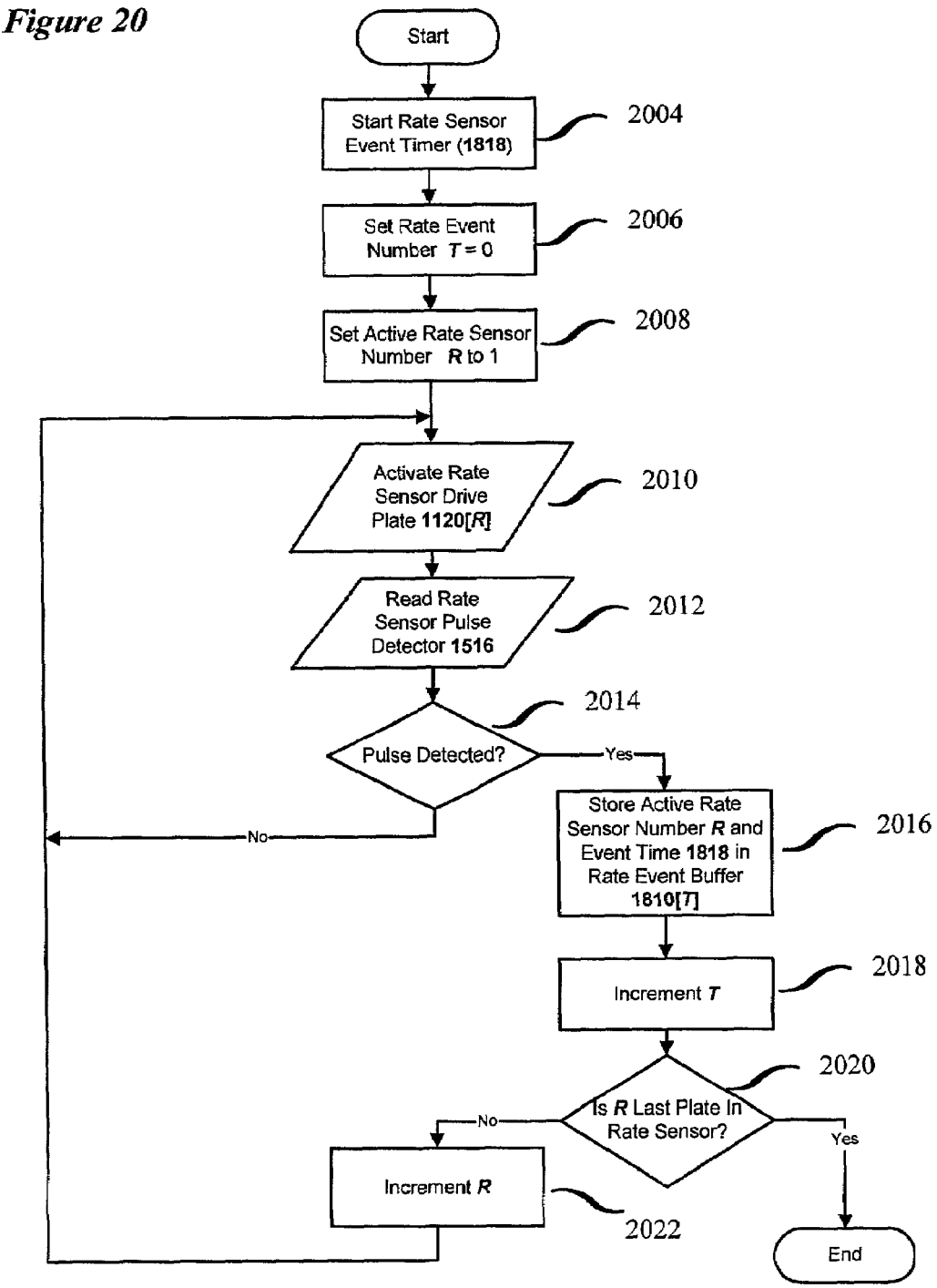
FIG. 20 is a flow chart of a rate sensing algorithm according to another embodiment of the present invention.

FIG. 20 is a flow diagram of an embodiment of a rate sensor method for use with the differential rate sensor embodiments of FIGS. 11 and 12 and the rate sensing circuit of FIG. 16. The initialization procedure of steps 2004, 2006 and 2008 is similar to that of FIG. 19, except that background signal levels are not detected. As with the embodiment of FIG. 19, the finger detector corresponding to the active rate sense drive plate number is activated in step 2010, and the pulse detector 1516 output is read in step 2012. If a pulse is detected in step 2014, the active finger detector number R and event time are stored in the rate event buffer 1810 in step 2016. The rate event number T is subsequently incremented in step 2018. If the active plate number is determined in step 2020 to be to the last finger detector in the rate sensor, the method exits. If the active finger detector is not the last finger detector, the active rate sensor number R is incremented in step 2022 and the method returns to step 2010 for further processing. If a pulse was not detected in step 2014 the method returns to step 2010 for continued execution.

It will be understood that the method of FIG. 20 scans each finger detector of the rate sensor sequentially until a single transition is detected, and then proceeds to the next finger detector. In other embodiments, the method may scan all finger detectors, and determine if there are transitions on any of the finger detectors. This advantageously provides detection of missed transitions.

Figure 21:
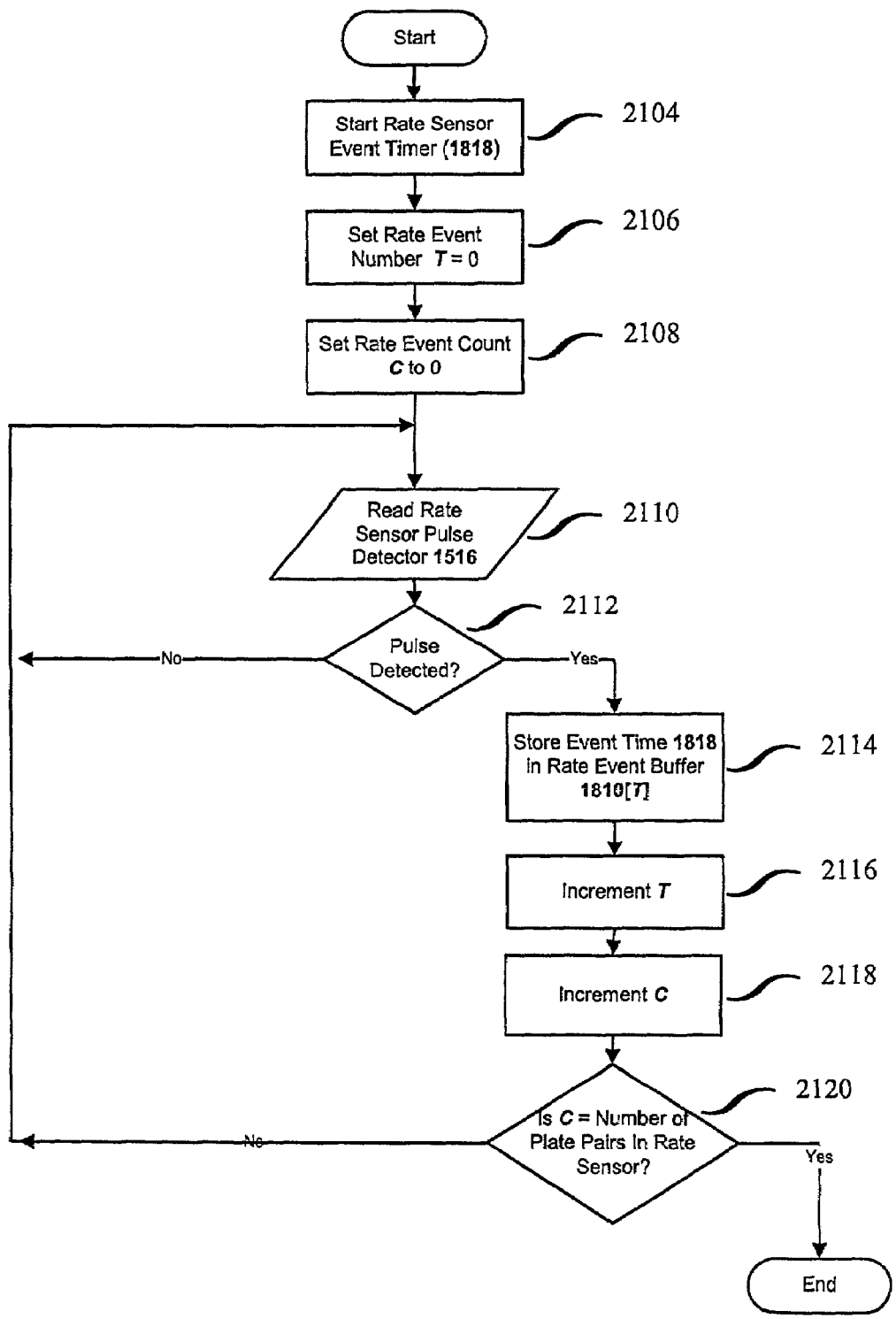
FIG. 21 is a flow chart of a rate sensing algorithm according to yet another embodiment of the present invention.

FIG. 21 is a flow diagram of an embodiment of a rate sensor method for use with the differential rate sensor embodiments of FIGS. 13 and 14 and the rate sensing circuit of FIG. 17. The rate sensor event timer and rate event number T are initialized in steps 2104 and 2106, respectively. In step 2108, a rate event count C is initialized. In step 2110, rate sensor pulse detector 1516 is read after the serpentine drive plate 1302 has been activated with a drive signal and the differential output of the rate sensor has been detected and processed. If a pulse is detected in step 2112, the rate event time is stored in the rate event buffer 1810 in step 2114, the rate event number T is incremented in step 2116, and the rate event count C is incremented in step 2118. If the rate event count C is determined in step 2120 to be equal to the number of finger detectors in the rate sensor, the method exits. If the rate event count C is not equal to the number of finger detectors in the rate sensor, or if a pulse is not detected in step 2112, then the method returns to step 2110 for further processing.

Figure 22:
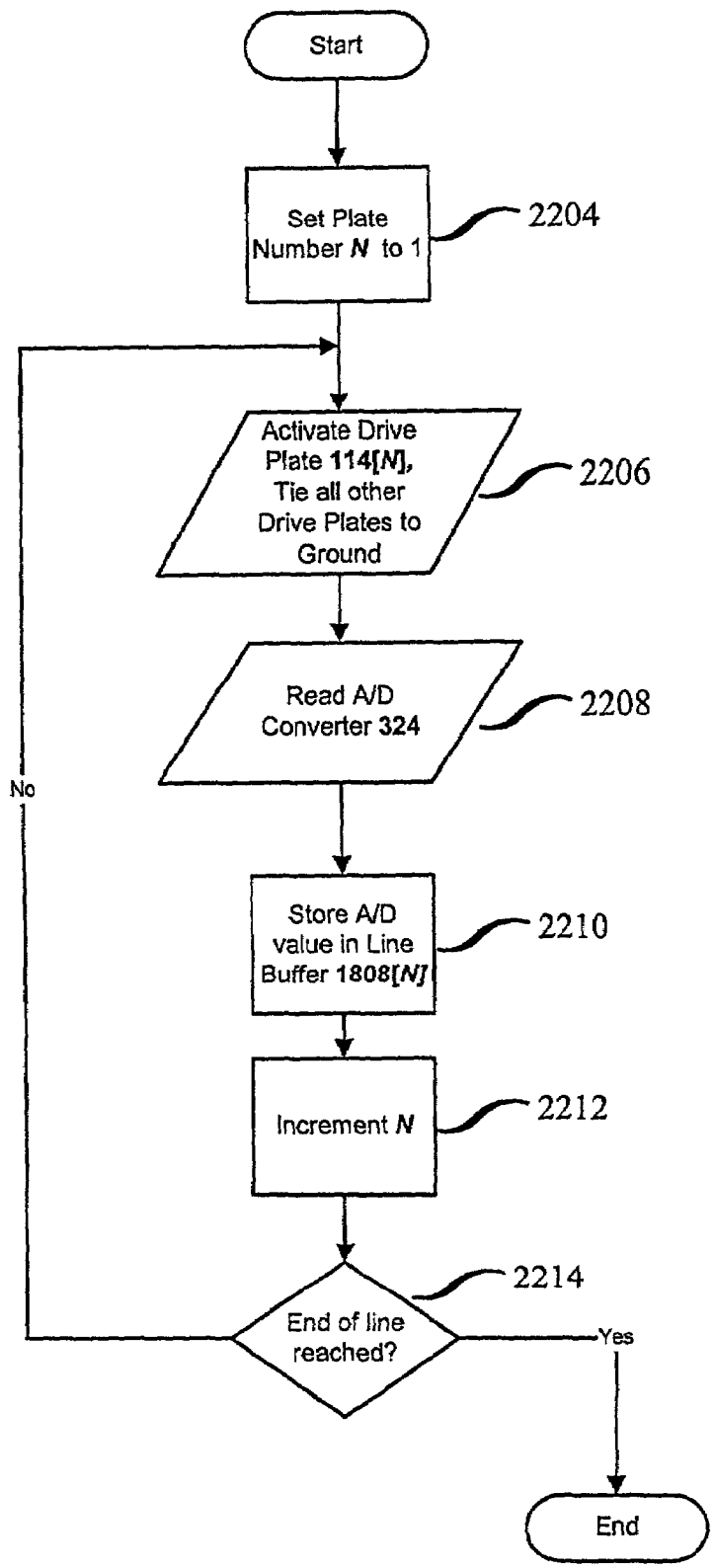
FIG. 22 is a flow chart of an image line acquisition algorithm according to an embodiment of the present invention.

FIG. 22 is a flow chart of an image line acquisition process in accordance with an embodiment of the present invention. In step 2204, a drive plate number N is initialized. The drive plate 114 corresponding to the plate number N is activated, and all other drive plates 114 are driven to ground in step 2206. Following detection and processing of the capacitively coupled drive signal, the output of A/D converter 324 (FIG. 3) is read in step 2208. The value read from analog-to-digital converter 324 is stored in the line buffer 1808 (FIG. 18) in step 2210. The plate number N is incremented in step 2212, and if all of the drive plates 114 in the image sensor are determined in step 2214 to have been activated, the process ends. If all drive plates in the image sensor have not been activated, the method returns to step 2206 for continued execution.

Figure 23:
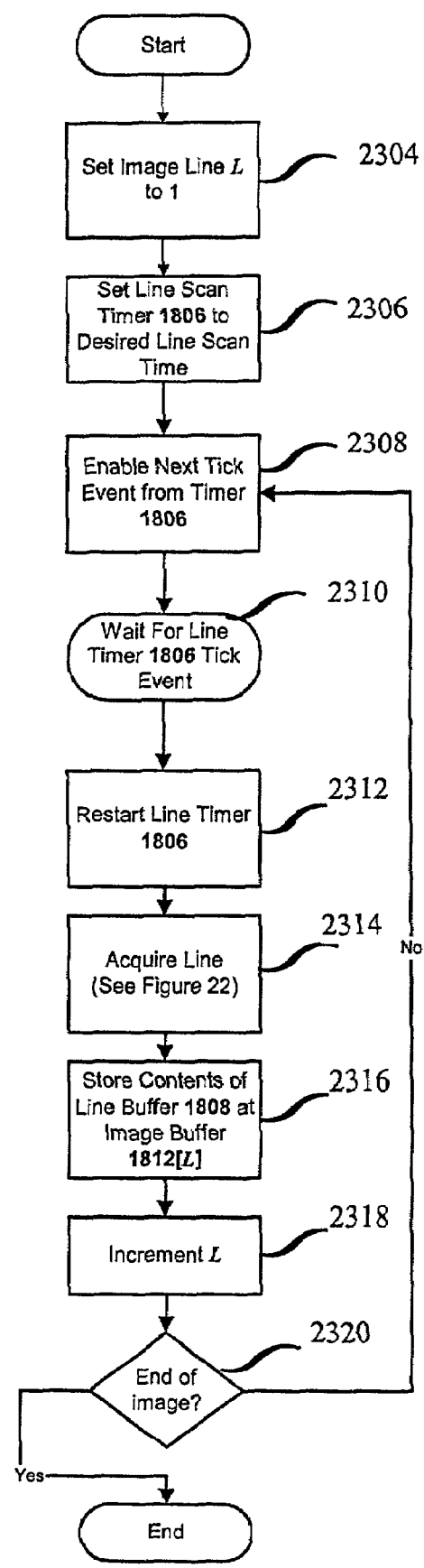
FIG. 23 is a flow chart of an image acquisition algorithm according to an embodiment of the present invention.

FIG. 23 is a flow chart of an image acquisition method that utilizes fixed time interval line sampling in accordance with an embodiment of the invention. In step 2304, an image line variable L is initialized. The line scan timer 1806 (FIG. 18) is initialized to a desired line scan time in step 2306. Subsequently, a next tick event from timer 1806 is enabled in step 2308. In step 2310, the process waits for a tick event from line scan timer 1806. After a tick event occurs, the line scan timer 1806 is restarted in step 2312. In step 2314, a line of image data is acquired, for example, in accordance with the line acquisition method described above in connection with FIG. 22. When a line of image data has been acquired, the contents of line buffer 1808 (FIG. 18) are stored in image buffer 1812 (FIG. 18). In step 2318, the image line variable L is incremented. If the entire image has been acquired (step 2320), i.e. L=the number of lines in the complete image, the process is complete. If the entire image has not been acquired, the process returns to step 2308 for further processing.

In one embodiment, an image acquired by this method is advantageously resampled based on the rate data gathered in the rate sensor event memory 1810 to produce an image whose lines are spaced at fixed distance intervals.

Figure 24:
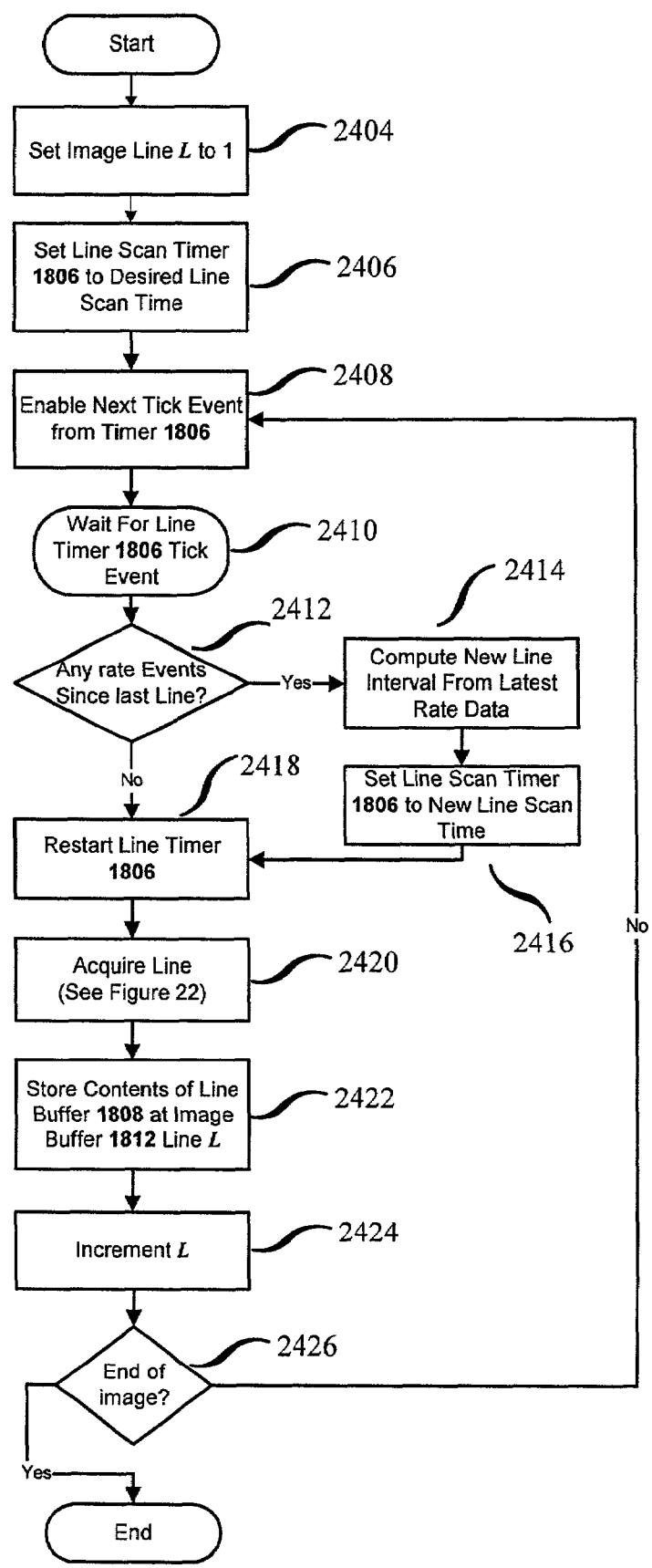
FIG. 24 is a flow chart of an image acquisition algorithm according to another embodiment of the present invention.

FIG. 24 illustrates a flow chart of another embodiment of an image acquisition method in accordance with the invention. In this embodiment, the line sampling time is controlled by a rate sensor. The image line number L is initialized in step 2404, and the line scan timer 1806 is set to the desired line scan time in step 2406. In step 2408, the next tick event from line scan timer 1806 is enabled. In step 2410, the process waits for a tick event from line scan timer 1806. If any rate events have been detected in step 2412 since the last line was acquired, a new line interval is computed from the most recent rate data in step 2414. The line scan timer 1806 is then set to the new line interval in step 2416. Subsequently, or if any rate events were not detected between the prior line acquisition and the tick event, line scan timer 1806 is restarted in step 2418. In step 2420, a line is acquired, for example, in accordance with the line acquisition method described above in connection with FIG. 22. The contents of line buffer 1808 (FIG. 18) are then stored in image buffer 1812 in step 2422. Then, the image line number L is incremented in step 2424. If the entire image has been acquired (step 2426), then the process is complete. If the entire image has not been acquired, the method returns to step 2408 for further processing.

Having thus described several illustrative embodiments of the invention, various alterations, modifications and improvements will readily occur to those skilled in the art. Such alterations, modifications and improvements are intended to be within the spirit and scope of the invention. Accordingly, the foregoing description is by way of example only as defined in the following claims and the equivalents thereto.

The invention claimed is:

1. Image sensing apparatus comprising:
   an image pickup plate disposed generally laterally with respect to a direction of movement of a finger; and
   a plurality of image drive plates in spaced relation to said image pickup plate to define a plurality of sensor gaps between respective image drive plates and said image pickup plate, wherein features of a fingerprint on the finger passing over said sensor gaps produce a change in capacitance between respective image drive plates and said image pickup plate.

2. Image sensing apparatus as defined in claim 1, wherein said image pickup plate and said plurality of image drive plates are dimensioned and spaced for sensing the fingerprint.

3. Image sensing apparatus as defined in claim 2, wherein a spacing between each of said image drive plates and said image pickup plate is less than about one half of the ridge spacing on a typical fingerprint.

4. Image sensing apparatus as defined in claim 2, wherein a spacing between adjacent ones of said image drive plates is less than about one half of the ridge spacing on a typical fingerprint.

5. Image sensing apparatus as defined in claim 1, wherein said image drive plates comprise parallel conductors disposed perpendicular to said image pickup plate and spaced from said image pickup plate by respective sensor gaps.

6. Image sensing apparatus as defined in claim 1, wherein said image pickup plate comprises two or more image pickup plates disposed generally laterally with respect to the direction of movement of the object.

7. Image sensing apparatus as defined in claim 2, including at least about 250 image drive plates.

8. Image sensing apparatus as defined in claim 1, further comprising a substrate, wherein said image pickup plate and said plurality of image drive plates comprise conductive traces on said substrate.

9. Image sensing apparatus as defined in claim 8, wherein said substrate comprises a printed circuit board.

10. Image sensing apparatus as defined in claim 8, wherein said substrate comprises a flexible substrate.

11. Image sensing apparatus as defined in claim 10, further comprising a substrate support, wherein said flexible substrate is affixed to said substrate support and wherein said substrate support has a contour selected to substantially match the contour of a typical finger.

12. Image sensing apparatus as defined in claim 1, further comprising:
   an excitation circuit for sequentially energizing said image drive plates with drive signals, and
   a detection circuit for detecting the drive signals capacitively coupled from said image drive plates to said image pickup plate to provide image signals.

13. Image sensing apparatus as defined in claim 12, wherein said drive signals comprise sequential signal bursts applied to respective ones of said image drive plates.

14. Image sensing apparatus as defined in claim 13, wherein said excitation circuit includes circuitry for coupling non-energized image drive plates to a reference potential.

15. Image sensing apparatus as defined in claim 13, wherein said signal bursts comprise bursts of a clock signal.

16. Image sensing apparatus as defined in claim 13, wherein said detection circuit comprises a synchronous detector for providing pulses in response to the detected signal bursts.

17. Image sensing apparatus as defined in claim 16, further comprising an analog-to-digital converter for converting said pulses to digital values, a memory and a processor for storing the digital values in said memory.

18. Image sensing apparatus as defined in claim 17, wherein said processor initiates a plurality of sequential line scans of said image drive plates to provide a plurality of line scans along lines of the moving object.

19. Image sensing apparatus as defined in claim 12, wherein said detection circuit includes an amplifier for receiving the capacitively coupled drive signals, said amplifier having a gain that is an inverse function of the amplitude of the capacitively coupled drive signals.

20. A fingerprint sensing system comprising:
   an image sensor comprising an array of capacitive sensors for capacitive sensing of ridge peaks and ridge valleys of a fingerprint on a moving finger, said image sensor comprising:
      an image pickup plate disposed generally laterally with respect to a direction of movement of the finger; and
      a plurality of image drive plates in spaced relation to said image pickup plate to define a plurality of sensor gaps between respective image drive plates and said image pickup plate, wherein ridge peaks and ridge valleys of the fingerprint passing over said sensor gaps produce a change in capacitance between respective image drive plates and said image pickup plate;
   a finger sensor for sensing a speed of the finger as it moves across said image sensor; and
   a sensor circuit for excitation of said image sensor with image drive signals and for detection of image signals in response to said image drive signals, for excitation of said finger sensor with finger drive signals and for detection of finger signals in response to said finger drive signals, and for coordinating said image signals and said finger signals to provide a fingerprint image.

21. A fingerprint sensing system as defined in claim 20, wherein a spacing between each of said image drive plates and said image pickup plate is less than about one half of the ridge spacing on a typical fingerprint.

22. A fingerprint sensing system as defined in claim 20, wherein a spacing between adjacent ones of said image drive plates is less than about one half of the ridge spacing on a typical fingerprint.

23. A fingerprint sensing system as defined in claim 20, wherein said image drive plates comprise parallel conductors disposed perpendicular to said image pickup plate and spaced from said image pickup plate by respective sensor gaps.

24. A fingerprint sensing system as defined in claim 20, wherein said at least one image pickup plate comprises two or more image pickup plates disposed generally laterally with respect to the direction of movement of the finger.

25. A fingerprint sensing system as defined in claim 20, including at least about 250 image drive plates.

26. A fingerprint sensing system as defined in claim 20, further comprising a substrate, wherein said at least one image pickup plate and said plurality of image drive plates comprise conductive traces on said substrate.

27. A fingerprint sensing system as defined in claim 26, wherein said substrate comprises a flexible substrate.

28. A fingerprint sensing system as defined in claim 27, further comprising a substrate support, wherein said flexible substrate is affixed to said substrate support and wherein said substrate support has a contour selected to substantially match the contour of a typical finger.

29. A fingerprint sensing system as defined in claim 20, wherein said sensor circuit comprises:
an excitation circuit for sequentially energizing said image drive plates with said image drive signals, and
a detection circuit for detecting the image drive signals capacitively coupled from said image drive plates to said image pickup plate to provide said image signals.

30. A fingerprint sensing system as defined in claim 29, wherein said image drive signals comprise sequential signal bursts applied to respective ones of said image drive plates.

31. A fingerprint sensing system as defined in claim 30, wherein said excitation circuit includes circuitry for coupling non-energized image drive plates to a reference potential.

32. A fingerprint sensing system as defined in claim 30, wherein said detection circuit comprises a synchronous detector for providing pulsed image signals.

33. A fingerprint sensing system as defined in claim 32, wherein said sensor circuit further comprises an analog-to-digital converter for converting said pulsed image signals to digital values, a memory and a processor for storing the digital values in said memory.

34. A fingerprint sensing system as defined in claim 33, wherein said processor initiates a plurality of sequential line scans of said image drive plates to provide a plurality of line scans along lines of the moving finger.

35. A fingerprint sensing system as defined in claim 29, wherein said detection circuit includes an amplifier for receiving the capacitively coupled image drive signals, said amplifier having a gain that is an inverse function of the amplitude of the capacitively coupled image drive signals.

36. A fingerprint sensing system as defined in claim 20, wherein said finger sensor comprises:
two or more finger detectors spaced apart along a direction of movement of the finger, each of said finger detectors including at least one finger drive plate and at least one finger pickup plate, wherein an end of the finger passing over each of said finger detectors produces a change in capacitance between respective finger drive plates and finger pickup plates.

37. A fingerprint sensing system as defined in claim 36, wherein the finger drive plate and the finger pickup plate of each of said finger detectors are disposed generally laterally with respect to the direction of movement of the finger.

38. A fingerprint sensing system as defined in claim 36, wherein the finger pickup plates of said finger detectors are commonly connected.

39. A fingerprint sensing system as defined in claim 36, wherein each of said finger detectors includes first and second finger pickup plates disposed on opposite sides of the finger drive, plate to form a differential capacitive sensor.

40. A fingerprint sensing system as defined in claim 39, wherein the finger drive plates of said finger detectors are commonly connected.

41. A fingerprint sensing system as defined in claim 36, wherein the finger drive plates and the finger pickup plates of said finger detectors are curved to substantially match the curve of a typical finger end.

42. A fingerprint sensing system as defined in claim 36, further comprising a substrate, wherein said finger drive plates and said finger pickup plates comprise conductive traces on said substrate.

43. A fingerprint sensing system as defined in claim 36, further comprising a flexible substrate, wherein said finger drive plates and said finger pickup plates comprise conductive traces on said flexible substrate.

44. A fingerprint sensing system as defined in claim 36, wherein said sensor circuit comprises:
an excitation circuit for energizing the finger drive plates of said finger detectors with said finger drive signals, and
a detection circuit for detecting the finger drive signals capacitively coupled from the finger drive plate to the finger pickup plate of each of said finger detectors to provide said finger signals.

45. A fingerprint sensing system as defined in claim 44, wherein said finger drive signals comprise signal bursts.

46. A fingerprint sensing system as defined in claim 45, wherein said detection circuit comprises a synchronous detector.

47. A fingerprint sensing system as defined in claim 44, wherein said sensor circuit further comprises a processing circuit for detecting a time delay between said finger signals from said finger detectors, wherein said time delay between said finger signals is representative of the speed of the finger.

48. A fingerprint sensing system as defined in claim 20, further comprising a substrate, wherein said image sensor and said finger sensor are fabricated on said substrate.

49. A fingerprint sensing system as defined in claim 48, wherein said substrate comprises a flexible substrate.

50. A fingerprint sensing system as defined in claim 48, wherein said sensor circuit is mounted on said substrate.

51. A fingerprint sensing method, comprising the steps of:
capacitively sensing ridge peaks and ridge valleys of a fingerprint on a swiped finger with an array of capacitive sensors and providing image signals representative of a line of the fingerprint, the array of capacitive sensors comprising an image pickup plate and a plurality of image drive plates in spaced relation to the image pickup plate to define a plurality of sensor gaps between respective image drive plates and the image pickup plate; and
acquiring from the array of capacitive sensors image signals representative of multiple lines of the fingerprint to provide a fingerprint image.

52. A fingerprint sensing method as defined in claim 51, further comprising:

sensing a speed of the finger as it is swiped across the array of capacitive sensors and providing finger signals; and coordinating the image signals and the finger signals to provide a fingerprint image.

53. Image sensing apparatus as defined in claim 1, wherein said image pickup plate and said plurality of image drive plates are substantially coplanar.

54. A fingerprint sensing system as defined in claim 20, wherein said image pickup plate and said plurality of drive plates are substantially coplanar.

55. A fingerprint sensing system as defined in claim 36, wherein the finger drive plate and the finger pickup plate of each of said finger detectors are substantially coplanar.

56. A capacitive sensor comprising:
a pickup plate; and
a plurality of drive plates in spaced relation to said pickup plate to define an array of sensor gaps between respective drive plates and said pickup plate, said pickup plate and said plurality of drive plates being substantially coplanar, wherein a finger passing above said array of sensor gaps produces a change in capacitance between respective drive plates and said pickup plate.

57. A capacitive sensor as defined in claim 56, wherein said pickup plate and said plurality of drive plates comprise conductive traces on a substrate.

58. A capacitive sensor as defined in claim 57, wherein said substrate comprises a flexible substrate.

59. A capacitive sensor as defined in claim 56, wherein said pickup plate and said plurality of drive plates are dimensioned and spaced for sensing a fingerprint on the finger.

60. A capacitive sensor as defined in claim 56, wherein said array of sensor gaps comprises a linear array.

61. A capacitive sensor as defined in claim 58, wherein said sensor gaps have dimensions of about 5 to 50 micrometers.

62. A fingerprint sensing system comprising:
an image sensor comprising an array of capacitive sensors for capacitive sensing of ridge peaks and ridge valleys of a fingerprint on a moving finger;
a finger sensor for sensing the speed of a finger as it moves across said image sensor, wherein said image sensor and said finger sensor are fabricated on a single substrate;
a sensor circuit, separate from said substrate, for operating said image sensor and said finger sensor to provide fingerprint data; and
wherein said image sensor further comprises:
an image pickup plate disposed generally laterally with respect to a direction of movement of the finger; and
a plurality of image drive plates in spaced relation to said imaae pickup plate to define a plurality of sensor gaps between respective image drive plates and image pickup plate.

63. A fingerprint sensing system as defined in claim 62, wherein said image pickup plate and said plurality of drive plates are substantially coplanar on said substrate.

64. Fingerprint sensing apparatus comprising:
an image sensor comprising an image pickup plate disposed generally laterally with respect to a direction of movement of a finger; and a plurality of image drive plates in spaced relation to said image pickup plate to define a plurality of sensor gaps between respective image drive plates and said image pickup plate, wherein said image pickup plate and said plurality of image drive plates are fabricated on a substrate; and
a sensor circuit, separate from said substrate, for excitation of said image sensor with image drive signals and for detection of image signals generated by said image sensor in response to said image drive signals.

65. Fingerprint sensing apparatus as defined in claim 64, wherein said image pickup plate and said plurality of image drive plates are substantially coplanar on said substrate.

66. A fingerprint sensor comprising:
a substrate;
an image pickup plate fabricated on said substrate and disposed generally laterally with respect to a direction of movement of a finger; and
a plurality of image drive plates fabricated on said substrate in spaced relation to said image pickup plate to define a plurality of sensor gaps between respective image drive plates and said image pickup plate.

67. A fingerprint sensor as defined in claim 66, wherein said plurality of sensor gaps comprises a linear array of sensor gaps.

68. A fingerprint sensor as defined in claim 66, wherein said image pickup plate and said plurality of image drive plates are substantially coplanar on said substrate.

69. A fingerprint sensor as defined in claim 66, further comprising a finger sensor, fabricated on said substrate, for sensing the speed of the finger as it moves across the sensor gaps.

* * * * *

UNITED STATES PATENT AND TRADEMARK OFFICE
CERTIFICATE OF CORRECTION

PATENT NO. : 7,099,496 B2
APPLICATION NO. : 10/005643
DATED : August 29, 2006
INVENTOR(S) : Fred G. Benkley, III It is certified that error appears in the above-identified patent and that said Letters Patent is hereby corrected as shown below:

Col. 20, line 11, the comma after "drive" should be deleted;
Col. 21, line 35, "claim 58" should be replaced by -- claim 59 --;
Col. 21, line 36, "5 to 50" should be replaced by -- 25 to 50 --; and
Col. 22, line 5, "imaae" should be replaced by -- image --.

Signed and Sealed this

Fifth Day of December, 2006

JON W. DUDAS
*Director of the United States Patent and Trademark Office*